United States Patent
Wagner et al.

(10) Patent No.: US 9,952,896 B2
(45) Date of Patent: Apr. 24, 2018

(54) ASYNCHRONOUS TASK MANAGEMENT IN AN ON-DEMAND NETWORK CODE EXECUTION ENVIRONMENT

(71) Applicant: Amazon Technologies, Inc., Seattle, WA (US)

(72) Inventors: Timothy Allen Wagner, Seattle, WA (US); Marc John Brooker, Seattle, WA (US); Ajay Nair, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 15/195,897

(22) Filed: Jun. 28, 2016

(65) Prior Publication Data

US 2017/0371706 A1    Dec. 28, 2017

(51) Int. Cl.
  *G06F 9/46*    (2006.01)
  *G06F 9/48*    (2006.01)

(52) U.S. Cl.
  CPC .......... *G06F 9/4831* (2013.01); *G06F 9/4881* (2013.01)

(58) Field of Classification Search
  None
  See application file for complete search history.

(56) References Cited

U.S. PATENT DOCUMENTS

| | | |
|---|---|---|
| 5,283,888 A | 2/1994 | Dao et al. |
| 5,970,488 A | 10/1999 | Crowe et al. |
| 6,708,276 B1 | 3/2004 | Yarsa et al. |
| 7,036,121 B1 | 4/2006 | Casabona et al. |
| 7,665,090 B1 | 2/2010 | Tormasov et al. |

(Continued)

FOREIGN PATENT DOCUMENTS

| | | |
|---|---|---|
| EP | 2663052 A1 | 11/2013 |
| WO | WO 2009/137567 A1 | 11/2009 |

(Continued)

OTHER PUBLICATIONS

Adapter Pattern, Wikipedia, https://en.wikipedia.org/w/index.php?title=Adapter_pattern&oldid=654971255, [retrieved May 26, 2016], 6 pages.

(Continued)

*Primary Examiner* — Van Nguyen
(74) *Attorney, Agent, or Firm* — Knobbe, Martens, Olson & Bear, LLP

(57) ABSTRACT

Systems and methods are described for managing asynchronous code executions in an on-demand code execution system or other distributed code execution environment, in which multiple execution environments, such as virtual machine instances, can be used to enable rapid execution of user-submitted code. When asynchronous executions occur, one execution may become blocked while waiting for completion of another execution. Because the on-demand code execution system contains multiple execution environments, the system can efficiently handle a blocked execution by saving a state of the execution, and removing it from its execution environment. When a blocking dependency operation completes, the system can resume the blocked execution using the state information, in the same or different execution environment.

22 Claims, 10 Drawing Sheets

(56) References Cited

U.S. PATENT DOCUMENTS

| | | | |
|---|---|---|---|
| 7,707,579 B2 | 4/2010 | Rodriguez | |
| 7,730,464 B2 | 6/2010 | Trowbridge | |
| 7,823,186 B2 | 10/2010 | Pouliot | |
| 7,886,021 B2 | 2/2011 | Scheifler et al. | |
| 8,010,990 B2 | 8/2011 | Ferguson et al. | |
| 8,024,564 B2 | 9/2011 | Bassani et al. | |
| 8,046,765 B2 | 10/2011 | Cherkasova et al. | |
| 8,065,676 B1 | 11/2011 | Sahai et al. | |
| 8,095,931 B1 | 1/2012 | Chen et al. | |
| 8,127,284 B2 * | 2/2012 | Meijer | G06F 9/44521 717/166 |
| 8,146,073 B2 | 3/2012 | Sinha | |
| 8,166,304 B2 | 4/2012 | Murase et al. | |
| 8,171,473 B2 | 5/2012 | Lavin | |
| 8,336,079 B2 | 12/2012 | Budko et al. | |
| 8,429,282 B1 | 4/2013 | Ahuja | |
| 8,448,165 B1 | 5/2013 | Conover | |
| 8,631,130 B2 | 1/2014 | Jackson | |
| 8,725,702 B1 | 5/2014 | Raman et al. | |
| 8,756,696 B1 | 6/2014 | Miller | |
| 8,806,468 B2 * | 8/2014 | Meijer | G06F 9/44521 717/166 |
| 8,825,964 B1 | 9/2014 | Sopka et al. | |
| 8,997,093 B2 | 3/2015 | Dimitrov | |
| 9,027,087 B2 | 5/2015 | Ishaya et al. | |
| 9,038,068 B2 | 5/2015 | Engle et al. | |
| 9,086,897 B2 | 6/2015 | Oh et al. | |
| 9,092,837 B2 | 7/2015 | Bala et al. | |
| 9,110,732 B1 | 8/2015 | Forschmiedt et al. | |
| 9,112,813 B2 | 8/2015 | Jackson | |
| 9,146,764 B1 | 9/2015 | Wagner | |
| 9,183,019 B2 | 11/2015 | Kruglick | |
| 9,208,007 B2 | 12/2015 | Harper et al. | |
| 9,223,561 B2 | 12/2015 | Orveillon et al. | |
| 9,323,556 B2 | 4/2016 | Wagner | |
| 9,361,145 B1 | 6/2016 | Wilson et al. | |
| 9,413,626 B2 | 8/2016 | Reque et al. | |
| 9,436,555 B2 | 9/2016 | Dornemann et al. | |
| 9,471,775 B1 | 10/2016 | Wagner et al. | |
| 9,483,335 B1 | 11/2016 | Wagner et al. | |
| 9,489,227 B2 | 11/2016 | Oh et al. | |
| 9,537,788 B2 | 1/2017 | Reque et al. | |
| 9,811,363 B1 * | 11/2017 | Wagner | G06F 9/45516 |
| 9,811,434 B1 * | 11/2017 | Wagner | G06F 9/45516 |
| 2003/0084434 A1 | 5/2003 | Ren | |
| 2004/0249947 A1 | 12/2004 | Novaes et al. | |
| 2004/0268358 A1 | 12/2004 | Darling et al. | |
| 2005/0044301 A1 | 2/2005 | Vasilevsky et al. | |
| 2005/0132368 A1 | 6/2005 | Sexton et al. | |
| 2005/0193113 A1 | 9/2005 | Kokusho et al. | |
| 2005/0193283 A1 | 9/2005 | Reinhardt et al. | |
| 2006/0248195 A1 | 11/2006 | Toumura et al. | |
| 2007/0094396 A1 | 4/2007 | Takano et al. | |
| 2007/0130341 A1 | 6/2007 | Ma | |
| 2008/0028409 A1 | 1/2008 | Cherkasova et al. | |
| 2008/0082977 A1 | 4/2008 | Araujo et al. | |
| 2008/0104608 A1 | 5/2008 | Hyser et al. | |
| 2008/0126110 A1 | 5/2008 | Haeberle et al. | |
| 2008/0126486 A1 | 5/2008 | Heist | |
| 2008/0189468 A1 | 8/2008 | Schmidt et al. | |
| 2008/0201711 A1 | 8/2008 | Husain | |
| 2009/0025009 A1 | 1/2009 | Brunswig et al. | |
| 2009/0055810 A1 | 2/2009 | Kondur | |
| 2009/0077569 A1 | 3/2009 | Appleton et al. | |
| 2009/0125902 A1 | 5/2009 | Ghosh et al. | |
| 2009/0158275 A1 | 6/2009 | Wang et al. | |
| 2009/0193410 A1 | 7/2009 | Arthursson et al. | |
| 2009/0198769 A1 | 8/2009 | Keller et al. | |
| 2009/0204964 A1 | 8/2009 | Foley et al. | |
| 2009/0300599 A1 | 12/2009 | Piotrowski | |
| 2010/0023940 A1 | 1/2010 | Iwamatsu et al. | |
| 2010/0031274 A1 | 2/2010 | Sim-Tang | |
| 2010/0031325 A1 | 2/2010 | Maigne et al. | |
| 2010/0115098 A1 | 5/2010 | De Baer et al. | |
| 2010/0122343 A1 | 5/2010 | Ghosh | |
| 2010/0131959 A1 | 5/2010 | Spiers et al. | |
| 2010/0186011 A1 | 7/2010 | Magenheimer | |
| 2010/0198972 A1 | 8/2010 | Umbehocker | |
| 2010/0199285 A1 | 8/2010 | Medovich | |
| 2010/0269109 A1 | 10/2010 | Cartales | |
| 2011/0029970 A1 | 2/2011 | Arasaratnam | |
| 2011/0055378 A1 | 3/2011 | Ferris et al. | |
| 2011/0055396 A1 | 3/2011 | DeHaan | |
| 2011/0099551 A1 | 4/2011 | Fahrig et al. | |
| 2011/0134761 A1 | 6/2011 | Smith | |
| 2011/0141124 A1 | 6/2011 | Halls et al. | |
| 2011/0153838 A1 | 6/2011 | Belkine et al. | |
| 2011/0184993 A1 | 7/2011 | Chawla et al. | |
| 2011/0265164 A1 | 10/2011 | Lucovsky | |
| 2012/0054744 A1 | 3/2012 | Singh et al. | |
| 2012/0072914 A1 | 3/2012 | Ota | |
| 2012/0096468 A1 | 4/2012 | Chakravorty et al. | |
| 2012/0110155 A1 | 5/2012 | Adlung et al. | |
| 2012/0110164 A1 | 5/2012 | Frey et al. | |
| 2012/0110588 A1 | 5/2012 | Bieswanger et al. | |
| 2012/0192184 A1 | 7/2012 | Burckart et al. | |
| 2012/0197958 A1 | 8/2012 | Nightingale et al. | |
| 2012/0233464 A1 | 9/2012 | Miller et al. | |
| 2012/0331113 A1 | 12/2012 | Jain et al. | |
| 2013/0042234 A1 | 2/2013 | DeLuca et al. | |
| 2013/0054927 A1 | 2/2013 | Raj et al. | |
| 2013/0097601 A1 | 4/2013 | Podvratnik et al. | |
| 2013/0111469 A1 | 5/2013 | B et al. | |
| 2013/0132942 A1 | 5/2013 | Wang | |
| 2013/0139152 A1 | 5/2013 | Chang et al. | |
| 2013/0151648 A1 | 6/2013 | Luna | |
| 2013/0179574 A1 | 7/2013 | Calder et al. | |
| 2013/0179894 A1 | 7/2013 | Calder et al. | |
| 2013/0185729 A1 | 7/2013 | Vasic et al. | |
| 2013/0191924 A1 | 7/2013 | Tedesco | |
| 2013/0198319 A1 | 8/2013 | Shen et al. | |
| 2013/0205092 A1 | 8/2013 | Roy et al. | |
| 2013/0219390 A1 | 8/2013 | Lee et al. | |
| 2013/0227641 A1 | 8/2013 | White et al. | |
| 2013/0232480 A1 | 9/2013 | Winterfeldt et al. | |
| 2013/0263117 A1 | 10/2013 | Konik et al. | |
| 2013/0297964 A1 | 11/2013 | Hegdal et al. | |
| 2013/0339950 A1 | 12/2013 | Ramarathinam et al. | |
| 2013/0346946 A1 | 12/2013 | Pinnix | |
| 2013/0346987 A1 | 12/2013 | Raney et al. | |
| 2014/0007097 A1 | 1/2014 | Chin et al. | |
| 2014/0019965 A1 | 1/2014 | Neuse et al. | |
| 2014/0019966 A1 | 1/2014 | Neuse et al. | |
| 2014/0040343 A1 | 2/2014 | Nickolov et al. | |
| 2014/0040857 A1 | 2/2014 | Trinchini et al. | |
| 2014/0059226 A1 | 2/2014 | Messerli et al. | |
| 2014/0068611 A1 | 3/2014 | McGrath et al. | |
| 2014/0082165 A1 | 3/2014 | Marr et al. | |
| 2014/0101649 A1 | 4/2014 | Kamble et al. | |
| 2014/0109087 A1 | 4/2014 | Jujare et al. | |
| 2014/0109088 A1 | 4/2014 | Dournov et al. | |
| 2014/0129667 A1 | 5/2014 | Ozawa | |
| 2014/0130040 A1 | 5/2014 | Lemanski | |
| 2014/0173614 A1 | 6/2014 | Konik et al. | |
| 2014/0173616 A1 | 6/2014 | Bird et al. | |
| 2014/0180862 A1 | 6/2014 | Certain et al. | |
| 2014/0201735 A1 | 7/2014 | Kannan et al. | |
| 2014/0207912 A1 | 7/2014 | Thibeault | |
| 2014/0215073 A1 | 7/2014 | Dow et al. | |
| 2014/0245297 A1 | 8/2014 | Hackett | |
| 2014/0279581 A1 | 9/2014 | Devereaux | |
| 2014/0282615 A1 | 9/2014 | Cavage et al. | |
| 2014/0289286 A1 | 9/2014 | Gusak | |
| 2014/0304698 A1 | 10/2014 | Chigurapati et al. | |
| 2014/0380085 A1 | 12/2014 | Rash et al. | |
| 2015/0074659 A1 | 3/2015 | Madsen et al. | |
| 2015/0120928 A1 | 4/2015 | Gummaraju et al. | |
| 2015/0235144 A1 | 8/2015 | Gusev et al. | |
| 2015/0350701 A1 | 12/2015 | Lemus et al. | |
| 2016/0072727 A1 | 3/2016 | Leafe et al. | |
| 2016/0092250 A1 | 3/2016 | Wagner et al. | |
| 2016/0092252 A1 | 3/2016 | Wagner | |
| 2016/0098285 A1 | 4/2016 | Davis et al. | |
| 2016/0224360 A1 | 8/2016 | Wagner et al. | |

(56) References Cited

U.S. PATENT DOCUMENTS

| | | |
|---|---|---|
| 2016/0224785 A1 | 8/2016 | Wagner et al. |
| 2016/0239318 A1 | 8/2016 | Wagner |
| 2016/0299790 A1 | 10/2016 | Thompson |
| 2016/0301739 A1 | 10/2016 | Thompson |

FOREIGN PATENT DOCUMENTS

| | | |
|---|---|---|
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |

OTHER PUBLICATIONS

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Nakajima, J., et al., Optimizing Virtual Machines Using Hybrid Virtualization, SAC '11, Mar. 21-25, 2011, TaiChung, Taiwan, pp. 573-578.

Qian, H., D. and Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Search Report and Written Opinion in PCT/US2015/052838 dated Dec. 18, 2015.

International Search Report and Written Opinion in PCT/US2015/052833 dated Jan. 13, 2016.

International Search Report and Written Opinion in PCT/US2015/064071dated Mar. 16, 2016.

International Search Report and Written Opinion in PCT/US2016/016211 dated Apr. 13, 2016.

International Search Report and Written Opinion in PCT/US2016/026514 dated Jun. 8, 2016.

International Search Report and Written Opinion in PCT/US2016/026520 dated Jul. 5, 2016.

International Search Report and Written Opinion in PCT/US2016/054774 dated Dec. 16, 2016.

\* cited by examiner

ASYNCHRONOUS TASK MANAGEMENT IN AN ON-DEMAND NETWORK CODE EXECUTION ENVIRONMENT

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
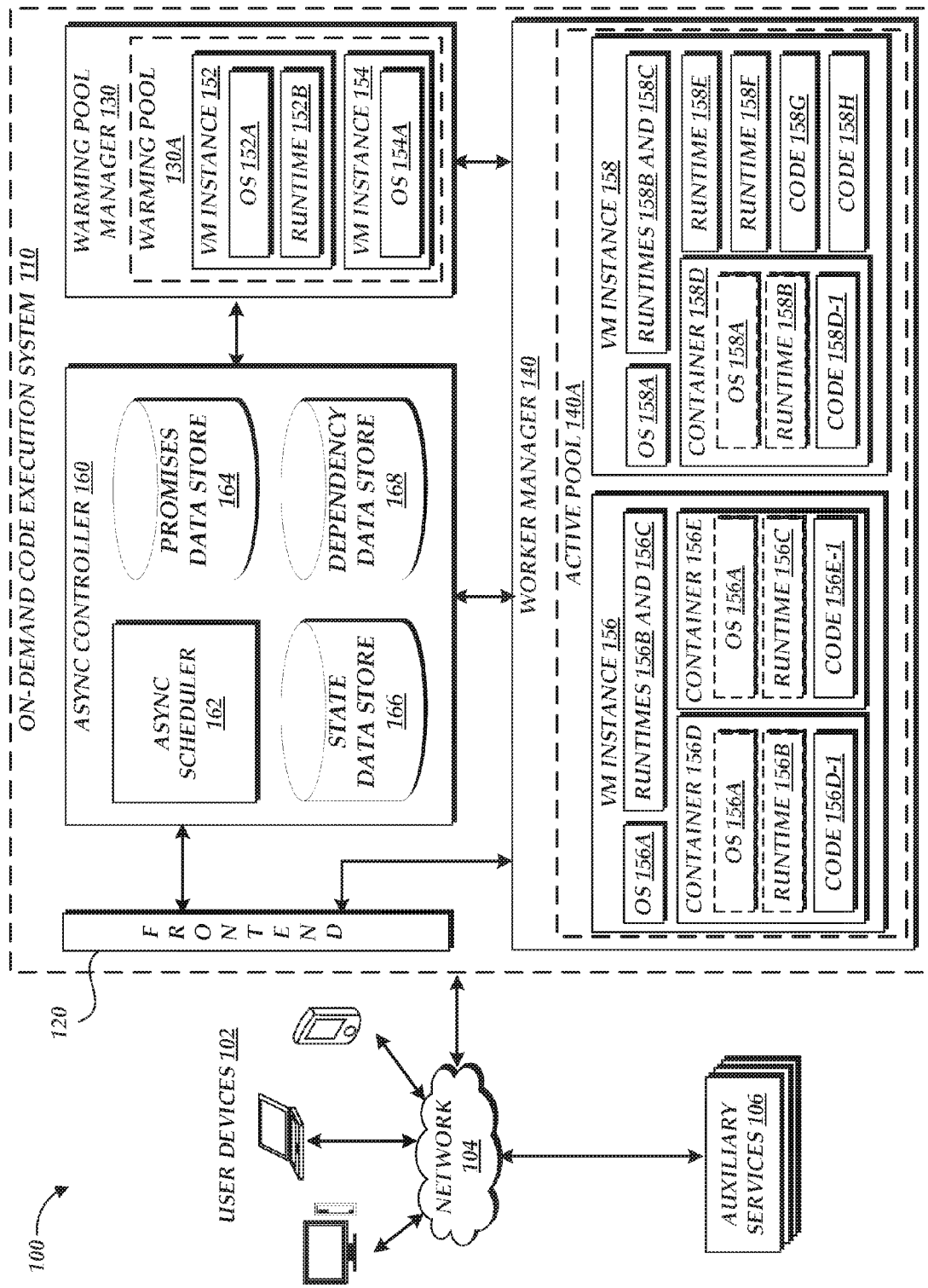
FIG. 1 is a block diagram depicting an illustrative environment in which an on-demand code execution system can operate, the on-demand code execution system including an async controller to manage asynchronous calls between tasks executing on the on-demand code execution system.

Generally described, aspects of the present disclosure relate to handling execution of asynchronous tasks in an on-demand code execution system, and more specifically, to using deadline information associated with an asynchronous task to efficiently execute the task, and to reducing the inefficiency of tasks whose execution is blocked due to an asynchronous dependency by suspending execution of the task. As described in detail herein, an on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task. The on-demand code execution system can further enable users to trigger execution of a task based on a variety of potential events, such as transmission of an application programming interface ("API") call or a specially formatted hypertext transport protocol ("HTTP") packet. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

A common programming technique in traditional environments is to allow asynchronous operations, such that two different operations (e.g., a thread and a network-request, two threads, etc.) may occur asynchronously from one another. Generally, asynchronous operations are managed by the execution environment in which code executes (e.g., the operating system, browser, virtual machine, etc., on which the code executes). However, in an on-demand code execution system, handling of asynchronous operations at the level of an execution environment can be inefficient. For example, asynchronous operations often result in instances where one operation becomes "blocked," waiting for another operation. In such instances, an execution environment can take action to reduce the computing resources dedicated to that operation (e.g., by suspending the blocked thread until it becomes unblocked). In an on-demand code execution system, performing such actions at the level of an execution environment can be inefficient, because the execution environment itself must generally remain in existence to detect when the operation becomes unblocked. The result is that an environment continues to utilize resources of the on-demand code execution system, potentially unnecessarily. Moreover, it is possible (and in some instances likely) that the state of the on-demand code execution system will change between a time at which an operation begins and a time that it becomes "unblocked." Thus, while the on-demand code execution system may attempt to efficiently allocate computing resources to the initial execution of a task, a different allocation may be more efficient at a time when the task becomes unblocked. However, traditional suspension techniques, which occur within a localized execution environment, do not allow for efficient alteration of underlying computing resources when an operation becomes unblocked.

Aspects of the present application address the above-noted issues by enabling asynchronous tasks to be efficiently suspended when blocked, at least in part by suspending the execution environment in which the task operates. For example, when a task on the on-demand code execution system becomes blocked, the on-demand code execution system can save state information regarding the task (such as a state of objects within the task), and suspend or deconstruct the execution environment in which the state has been operating. The on-demand code execution system can then generate a notifier associated with the task's dependency (e.g., the operation on which the task has become blocked) and, on completion of that dependency, regenerate an execution environment for the task on the on-demand code execution system such that execution of the task can continue. In this manner, the computing resources associated with maintaining an execution environment for a blocked task can be reduced or eliminated, increasing the efficiency of the on-demand code execution system.

Another characteristic of asynchronous operations is that, in some instances, a dependency operation (an operation on which another operation depends) may complete before such completion is actually required by a dependent operation (an operation that depends on another operation). For example, a first operation (a dependent operation) may asynchronously call a second operation (the dependency operation) and be programmed to continue performing other processes until the result of the second operation is needed. Under some conditions, the second operation may complete before a result is needed by the first operation. In traditional environments, this generally does not result in adverse effect, since the result of the second operation can be stored until needed by the first operation. However, in an on-demand code execution system, many operations may be occurring simultaneously across a number of execution environments, and the on-demand code execution system may attempt to distribute those operations in an efficient manner, to reduce the overall computing resources needed by the on-demand code execution system at any given time. Moreover, many operations may be time-dependent, such that a result is needed very quickly (e.g., within milliseconds), and these operations can be negatively impacted by load-balancing efforts, such as queueing. Accordingly, completion of operations before a result is required can have a negative overall impact on the system (e.g., because the computing resources required to complete the operation could have been used to complete other, more urgent operations).

Aspects of the present application address this issue by enabling asynchronous tasks executing on the on-demand code execution system to be associated with a "deadline," indicating a predicted time at which a result of the task will be required by a dependent task. When an asynchronous, dependency task is called, the on-demand code execution system can determine a deadline for the task, and enqueue the task for execution by the deadline. For example, rather than executing the dependency task immediately, the on-demand code execution system may delay execution until excess resources are available at the on-demand code execution system, or until the deadline is reached. Thus, execution of asynchronous tasks at the on-demand code execution system can be ordered to increase the efficiency at which the computing resources of the system are used.

The execution of tasks on the on-demand code execution system will now be discussed. Specifically, to execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

As will be appreciated by one skilled in the art, the embodiments described herein function to improve the functioning of computing devices by enabling those devices to rapidly execute code of many users within an on-demand code execution system. Moreover, in the context of an on-demand code execution system, the present disclosure enables the efficient execution of code within execution environments (e.g., virtual machine instances, containers, etc.), while reducing inefficiencies associated with asynchronous operations. Specifically, the present disclosure enables a reduction in the computing resources associated with blocked operations, by enabling an execution environment of that blocked operation to be suspended, and enabling that environment to be recreated when the operation becomes unblocked. Further, the present disclosure enables efficient scheduling of asynchronous operations by the use of deadlines associated with those operations. Thus, one skilled in the art will appreciate by virtue of the present disclosure that the embodiments described herein represent a substantial contribution to the technical field of virtual machine usage management, network-based code execution, and to computing devices in general.

The foregoing aspects and many of the attendant advantages of this disclosure will become more readily appreciated as the same become better understood by reference to the following detailed description, when taken in conjunction with the accompanying drawings.

FIG. 1 is a block diagram of an illustrative operating environment 100 in which an on-demand code execution system 110 may operate based on communication with user computing devices 102 and auxiliary services 106. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programing interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), data bases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. As described below, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The user computing devices 102 and auxiliary services 106 may communication with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 may be connected to the network 104, and other components of the on-demand code execution system 110 may communicate with other components of the virtual environment 100 via the frontend 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution system 110, the environment 110 includes a frontend 120, which enables interaction with the on-demand code execution system 110. In an illustrative embodiment, the frontend 120 serves as a "front door" to the other services provided by the on-demand code execution system 110, enabling users (via user computing devices 102) to provide, request execution of, and view results of computer executable code. The frontend 120 includes a variety of components (not shown in FIG. 1) to enable interaction between the on-demand code execution system 110 and other computing devices. For example, the frontend 120 can includes a request interface providing user computing devices 102 with the ability to upload or otherwise communication user-specified code to the on-demand code execution system 110 and to thereafter request execution of that code. In one embodiment, the request interfaces communicates with external computing devices (e.g., user computing devices 102, auxiliary services 106, etc.) via a graphical user interface (GUI), CLI, or API. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed.

A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can further include an execution queue (not shown in FIG. 1), which can maintain a record of user-requested task executions. Illustratively, the number of simultaneous task executions by the on-demand code execution system 110 is limited, and as such, new task executions initiated at the on-demand code execution system 110 (e.g., via an API call) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. The number and configuration of execution queues may in some instances be modified based on pre-trigger notifications received at the on-demand code execution system 110 (e.g., based on a predicted number of subsequent task calls to be received based on the pre-trigger notifications). In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 120). Alternatively or additionally, tasks may be triggered for execution at the on-demand code execution system 110 based on data retrieved from one or more auxiliary services 106. To facilitate interaction with auxiliary services 106, the frontend 120 can include a polling interface (not shown in FIG. 1), which operates to poll auxiliary services 106 for data. Illustratively, the polling interface may periodically transmit a request to one or more user-specified auxiliary services 106 to retrieve any newly available data (e.g., social network "posts," news articles, etc.), and to determine whether that data corresponds to a user-established criteria triggering execution a task on the on-demand code execution system 110. Illustratively, criteria for execution of a task may include, but is not limited to, whether new data is available at the auxiliary services 106, the type or content of the data, or timing information corresponding to the data. In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) or pre-trigger notifications (received pre-trigger notifications, actions taken based on pre-trigger notification, determined correlations between pre-trigger notifications and subsequent task executions, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

While not shown in FIG. 1, in some embodiments, the on-demand code execution system 110 may include multiple frontends 120. In such embodiments, a load balancer may be provided to distribute the incoming calls to the multiple frontends 120, for example, in a round-robin fashion. In some embodiments, the manner in which the load balancer distributes incoming calls to the multiple frontends 120 may be based on the state of the warming pool 130A and/or the active pool 140A. For example, if the capacity in the warming pool 130A is deemed to be sufficient, the calls may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the calls may be distributed to the multiple frontends 120 in a manner that reduces or minimizes the number of virtual machine instances taken from the warming pool 130A. For example, even if, according to a load balancing restriction, a call is to be routed to Frontend A, if Frontend A needs to take an instance out of the warming pool 130A to service the call but Frontend B can use one of the instances in its active pool to service the same call, the call may be routed to Frontend B.

To execute tasks, the on-demand code execution system 110 includes a warming pool manager 130, which "pre-warms" (e.g., initializes) virtual machine instances to enable tasks to be executed quickly, without the delay caused by initialization of the virtual machines. The on-demand code execution system 110 further includes a worker manager 140, which manages active virtual machine instances (e.g., currently assigned to execute tasks in response to task calls).

The warming pool manager 130 ensures that virtual machine instances are ready to be used by the worker manager 140 when the on-demand code execution system 110 detects an event triggering execution of a task on the on-demand code execution system 110. In the example illustrated in FIG. 1, the warming pool manager 130 manages the warming pool 130A, which is a group (sometimes referred to as a pool) of pre-initialized and pre-configured virtual machine instances that may be used to execute tasks in response to triggering of those tasks. In some embodiments, the warming pool manager 130 causes virtual machine instances to be booted up on one or more physical computing machines within the on-demand code execution system 110 and added to the warming pool 130A. For example, the warming pool manager 130 may cause additional instances to be added to the warming pool 130A based on the available capacity in the warming pool 130A to service incoming calls. As will be described below, the warming pool manager 130 may further work in conjunction with other components of the on-demand code execution system 110, such as the worker manager 140, to add or otherwise manage instances and/or containers in the warming pool based on received pre-trigger notifications. In some embodiments, the warming pool manager 130 may utilize both physical computing devices within the on-demand code execution system 110 and one or more virtual machine instance services to acquire and maintain compute capacity that can be used to service calls received by the frontend 120. Further, the on-demand code execution system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific call to execute a task. The predetermined set of configurations can correspond to various types of virtual machine instances to execute tasks. The warming pool manager 130 can optimize types and numbers of virtual machine instances in the warming pool 130A based on one or more metrics related to current or previous task executions. Further, the warming pool manager 130 can establish or modify the types and number of virtual machine instances in the warming pool 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's calls. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pool 130A are usable by which user), among other specified conditions.

The worker manager 140 manages the instances used for servicing incoming calls to execute tasks. In the example illustrated in FIG. 1, the worker manager 140 manages the active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, tasks are executed in isolated on-demand code execution systems referred to as containers (e.g., containers 156D, 156E, 158D). Containers are logical units created within a virtual machine instance using the resources available on that instance. For example, the worker manager 140 may, based on information specified in a call to execute a task, create a new container or locate an existing container in one of the instances in the active pool 140A and assigns the container to the call to handle the execution of the task. In one embodiment, such containers are implemented as Linux containers.

Once a triggering event to execute a task has been successfully processed by the frontend 120, the worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontend 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110. As will be described in more detail below, the frontend 120 may additionally interact with auxiliary services 106 to receive pre-trigger notifications indicating a potential for subsequent calls to execute tasks on the on-demand code execution system 110.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The worker manager 140 may include an instance allocation unit for finding compute capacity (e.g., containers) to service incoming code execution requests and a user code execution unit for facilitating the execution of user codes on those containers. An example configuration of the worker manager 140 is described in greater detail within the '556 Patent, incorporated by reference above (e.g., within FIG. 2 of the '556 Patent). In some instance, the instance allocation unit's operation may be modified based on expected incoming code execution requests, as predicted based on received pre-trigger notifications. For example, where the on-demand code execution system 110 utilizes or has access to dynamically provisioned computing resources (such as dynamically provisioned network-based storage space, scalable access to processing power, etc.), the instance allocation unit may be configured to modify an amount of one or more of those dynamically provisioned computing resources. For example, the instance allocation unit may interact with a dynamically allocated network storage service (not shown in FIG. 1) to increase the amount of data storage available to virtual machine instances.

In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the on-demand code execution system 110 may comprise multiple frontends 120, multiple warming pool managers 130, and/or multiple worker managers 140. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although a single warming pool 130A and a single active pool 140A are shown in the example of FIG. 1, the embodiments described herein are not limited as such, and one skilled in the art will appreciate that the on-demand code execution system 110 may comprise any number of warming pools and active pools.

While not shown in FIG. 1, in some embodiments, the on-demand code execution system 110 may include multiple warming pool managers 130 and/or multiple worker managers 140, each operating distinct warming pools 130A and active pools 140A. For example, a variety of warming pools 130A and active pools 140A may be established at different geographic locations, each with a corresponding warming pool manager 130 and worker manager 140. The frontend 120 may distribute tasks among different active pools 140A according to a variety of criteria, such as load balancing of the pools, a location of the resources required by the task, or the suitability of virtual machines instances in the pools to execute the task.

In accordance with embodiments of the present disclosure, the on-demand code execution system 110 further includes an async controller 160, which includes components for managing asynchronous operations on the on-demand code execution system 110. As used herein, asynchronous operations can refer to any combination of operation types, including for example two tasks on the on-demand code execution system 160, or a first task on the on-demand code execution system 160 and a second, non-task operation (e.g., an HTTP request, an API call to an external service). In order to efficiently execute tasks that utilize asynchronous operation, the async controller 160 can include an async scheduler 162, which interacts with components of the on-demand code execution system 110 to enable tasks that have become "blocked" waiting on an operation to be removed from an execution environment (potentially resulting in suspension or deconstruction of the execution environment), to reduce the computing resources associated with the task. To enable the task to resume once a dependency operation has completed, the async scheduler 162 can store state information of the task within a state data store 166. The async scheduler 162 can further store information about the dependencies of the task within a dependency data store 168, such that the task can be resumed when the dependencies have been fulfilled. For example, the async controller 162 can operate to receive notifications for when a dependency operation has completed, and interact with other components of the on-demand code execution system 110 to resume the task, by using the information from the state data store 166 to place the task in a new execution environment with the same state it had prior to being removed from its initial execution environment, or by recreating the prior execution environment. Moreover, the async scheduler 162 can operate to efficiently order the execution of dependencies, in instances where those dependencies are not required to execute immediately. Specifically, the async scheduler 162 can be notified of a dependency operation, as well as a deadline at which completion of the dependency operation is expected to complete, and interact with other components of the on-demand code execution system 110 to schedule execution of the dependency operation at an efficient time prior to the deadline (e.g., a time in which the on-demand code execution environment 110 has excess capacity). For ease of description, an asynchronous dependency operation, and particularly those that are not required to execute immediately, are sometimes referred to herein as "promises" (e.g., representing a figurative "promise" that the operation will complete in the future, when needed). Also for ease of description, the results of asynchronous dependency operations ("promises") may sometimes be referred to herein as "futures" (e.g., representing a value that is not initially available, but is expected to become available in the future). Information regarding promises and futures may be stored within a promises data store 164. Each of the promises data store 164, the state data store 166, and the dependency data store 168 may correspond to any persistent or substantially persistent data storage, such as a hard drive (HDD), a solid state drive (SDD), network attached storage (NAS), a tape drive, or any combination thereof. While shown as multiple data stores, any of the promises data store 164, the state data store 166, and the dependency data store 168 may be implemented on common underlying data storage devices.

Figure 2:
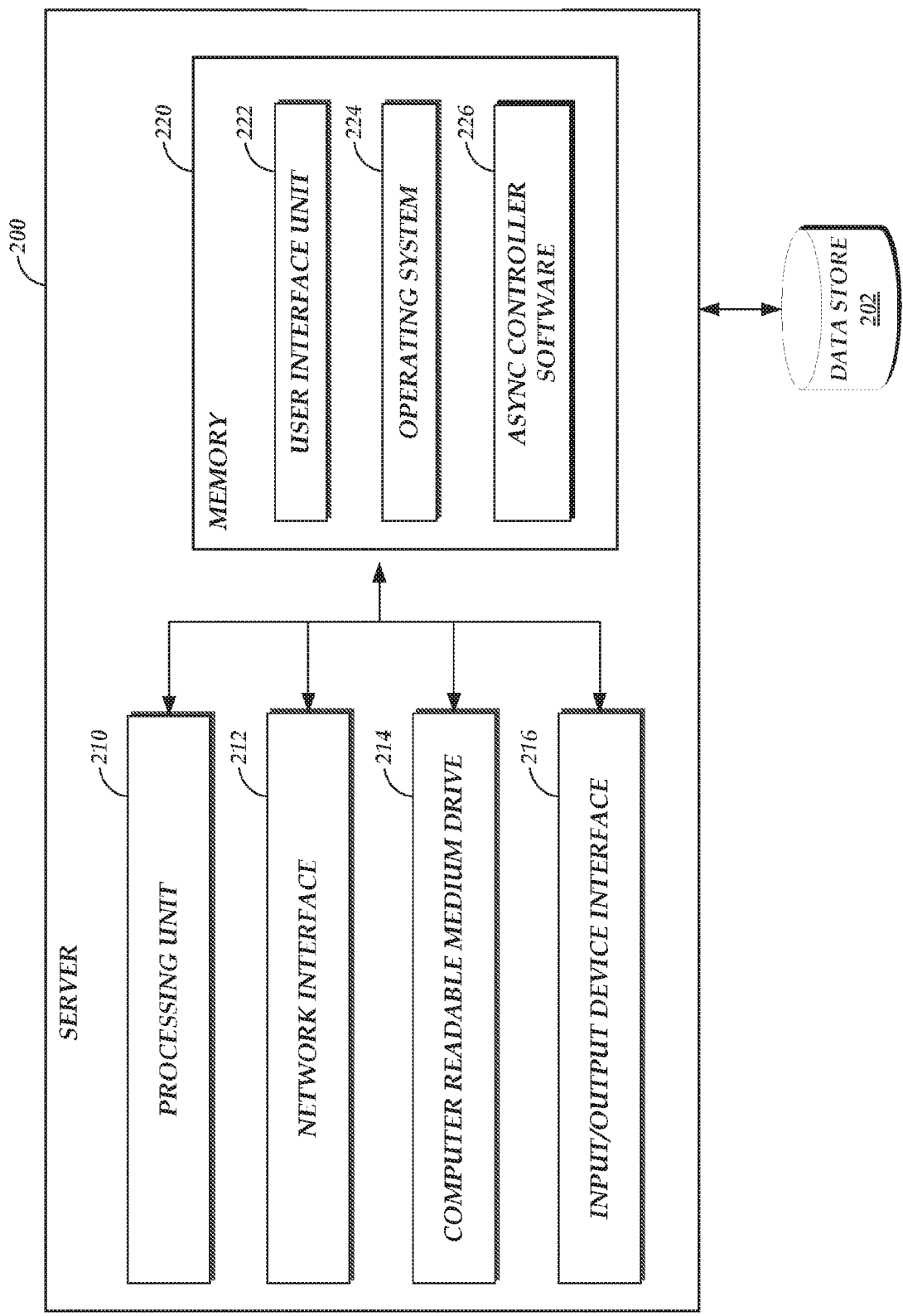
FIG. 2 depicts a general architecture of a computing device providing the async controller of FIG. 1.

FIG. 2 depicts a general architecture of a computing system (referenced as server 200) that implements embodiments of the present disclosure to enable handling of asynchronous task executions on the on-demand code execution system 110. The general architecture of the server 200 depicted in FIG. 2 includes an arrangement of computer hardware and software modules that may be used to implement aspects of the present disclosure. The hardware modules may be implemented with physical electronic devices, as discussed in greater detail below. The server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the server 200 includes a processing unit 210, a network interface 212, a computer readable medium drive 214, and an input/output device interface 216, all of which may communicate with one another by way of a communication bus. The network interface 212 may provide connectivity to one or more networks or computing systems. The processing unit 210 may thus receive information and instructions from other computing systems or services via the network 104. The processing unit 210 may also communicate to and from memory 220 and further provide output information for an optional display (not shown) via the input/output device interface 216. The input/output device interface 216 may also accept input from an optional input device (not shown).

The memory 220 may contain computer program instructions (grouped as modules in some embodiments) that the processing unit 210 executes in order to implement one or more aspects of the present disclosure. The memory 210 generally includes RAM, ROM and/or other persistent, auxiliary or non-transitory computer readable media. The memory 210 may store an operating system 224 that provides computer program instructions for use by the processing unit 210 in the general administration and operation of the server 200. The memory 220 may further include computer program instructions and other information for implementing aspects of the present disclosure. For example, in one embodiment, the memory 220 includes a user interface unit 222 that generates user interfaces (and/or instructions therefor) for display upon a computing device, e.g., via a navigation and/or browsing interface such as a browser or application installed on the computing device. In addition, the memory 220 may include and/or communicate with one or more data repositories, such as the data store 202, which may correspond to any persistent or substantially persistent data storage, such as a hard drive (HDD), a solid state drive (SDD), network attached storage (NAS), a tape drive, or any combination thereof.

In addition to and/or in combination with the user interface unit 222, the memory 220 may include async controller software 226 that corresponds to computer-executable instructions which, when executed by the server 200, implement the functions described above with respect to the async controller 160. While async controller software 226 is shown in FIG. 2 as part of the server 200, in other embodiments, all or a portion of the async controller 160 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the account manager 160.

While the computing device of FIG. 2 is described as implementing the async controller 160, the same or a similar computing device may additionally or alternatively be utilized to implement other components of the on-demand code execution system 110. For example, such a computing device may be utilized, independently or in conjunction with other components (e.g., data stores) to implement the warming pool manager 130 or worker manager 140 of FIG. 1. The software or computer-executable instructions placed within the memory 220 may be modified to enable execution of the functions described herein with respect to the warming pool manager 130 or worker manager 140.

Figure 3A:
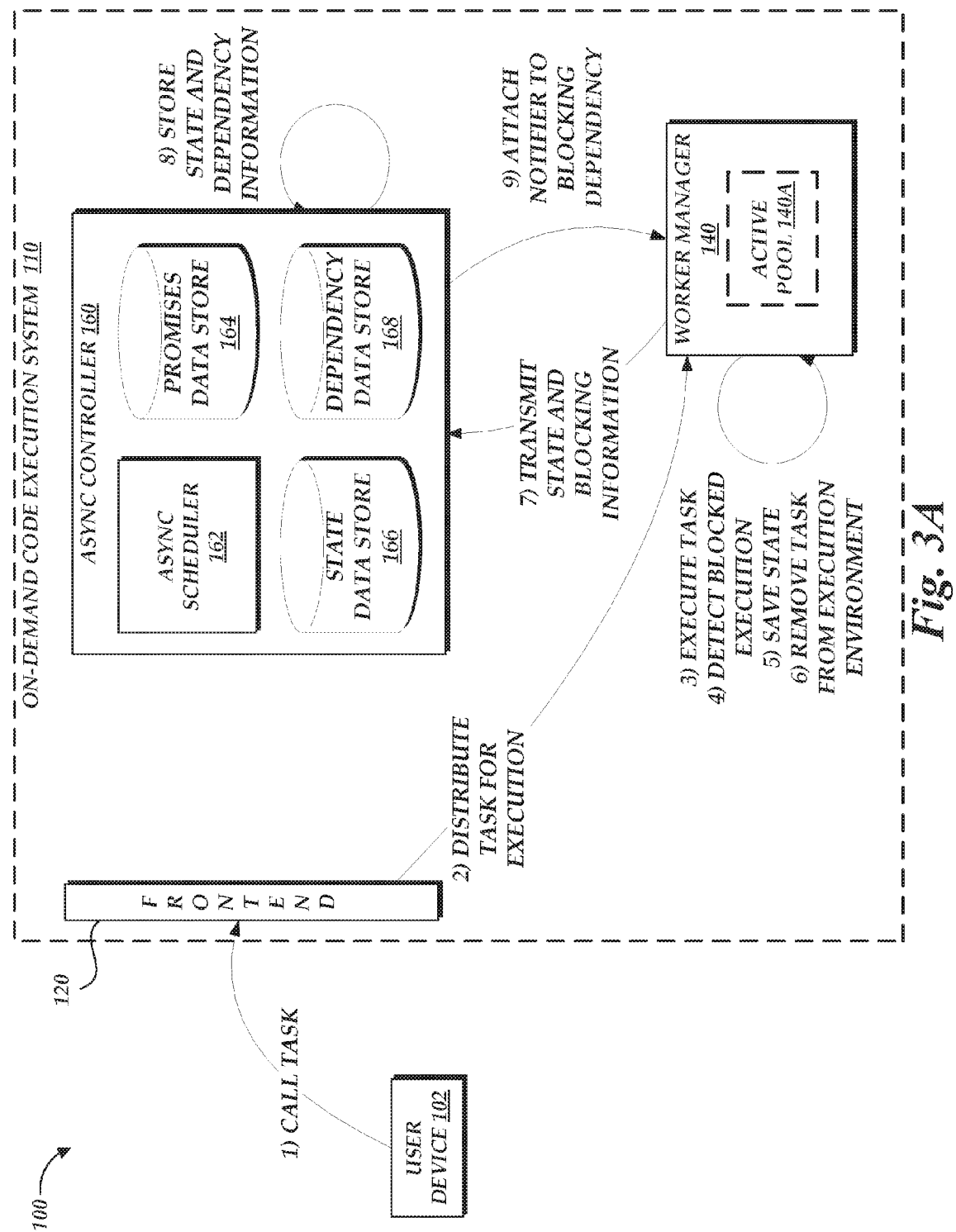
FIGS. 3A and 3B are flow diagrams depicting illustrative interactions for handling blocked execution of a task due to an asynchronous dependency by using the async controller of FIG. 1 to suspend execution of the task on the on-demand code execution system.
Figure 3B:
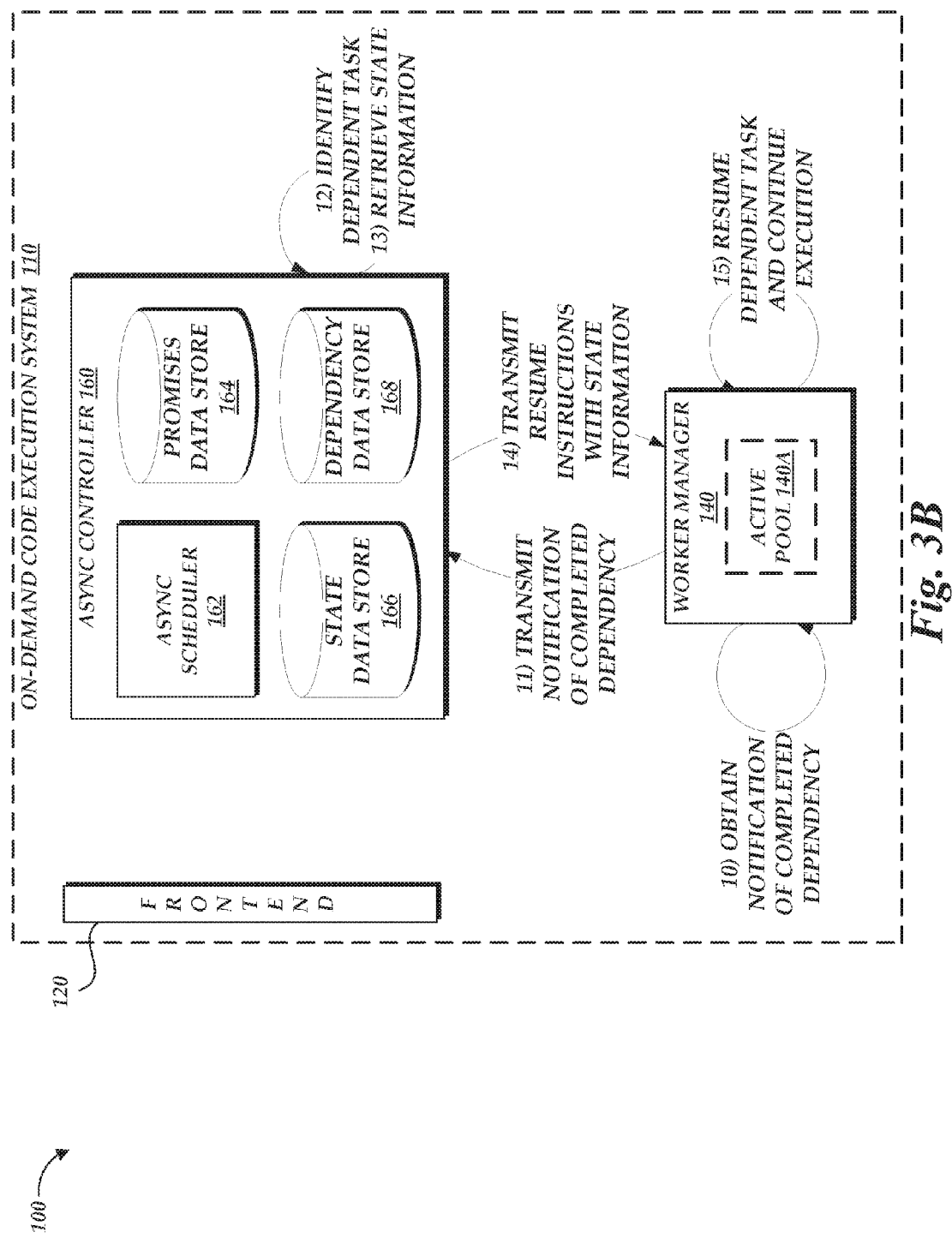

With reference to FIGS. 3A and 3B, illustrative interactions are depicted for efficiently handling blocked task executions on the on-demand code execution system 110, by removing the task from an execution environment within the active pool 140A while the task is blocked, and resuming the task within the same or a different execution environment when the task is unblocked. Specifically, FIG. 3A depicts interactions for detecting that a task is blocked, for saving the state of a task during blocking, and for removing the task from an execution environment. FIG. 3B depicts interactions for detecting that the dependency of the task has completed, and for resuming execution of the task in a new or recreated execution environment. While shown in two figures, the numbering of interactions in FIGS. 3A and 3B is maintained for clarity.

The interactions of FIG. 3A begin at (1), where a user device 102 submits to the frontend 120 a call to a task on the on-demand code execution system. As noted above, submission of a call may include transmission of specialized data to the frontend 120, such as a HTTP packet or API call referencing the task alias. While the interactions of FIG. 3A are described as including an explicit call to the task by the user device 102, calls to the task may occur in a variety of manners, including submission of a call by auxiliary services 106 (not shown in FIG. 3A) or generation of a call by the on-demand code execution system 110 (e.g., based on a rule to call the alias when specific criteria are met, such as elapsing of a period of time or detection of data on an auxiliary service 106). The call may include any information required to execute the task, such as parameters for execution, authentication information under which to execute the task or to be used during execution of the task, etc.

Thereafter, at (2), the frontend 120 distributes the task for execution by the worker manager 140. While not shown in FIG. 3A, in some instances the frontend 120 may perform additional operations prior to distributing the task to the worker manager 140, such as determining whether sufficient capacity exists to execute the task, queuing the task, determining accounts to which to attribute execution of the task, etc. Such operations are described in more detail in the '556 Patent.

After receiving distribution of the task, the worker manager 140, at (3), utilizes a virtual machine instance within the active pool 140 to execute the task. Selection of a virtual machine instance may include a variety of criteria, such as whether a virtual machine instance is available within the active pool 140A that satisfies requirements or preferences for executing the task (e.g., required permissions, resource access, dependencies, execution environment, etc.). In the instance that such a machine is not available within the active pool 140A, the worker manager 140 may interact with the warming pool manager 130 (not shown in FIG. 4) to add such a virtual machine instance to the active pool 140A, as described within the '556 Patent. In the instance that multiple virtual machine instances are available within the active pool 140 that satisfy requirements or preferences for executing the task, the worker manager 140 may select between the virtual machines based on a number of criteria, including but not limited to load balancing of the virtual machine instances.

During execution of the task, at (4), the worker manager 140 (e.g., by use of a virtual machine on which the task is executing) detects that execution of the task has become blocked due to a dependency on a separate asynchronous operation (an operation distinct from the task). The asynchronous operation may include, for example, a second task on the on-demand code execution system 110 or an operation on an external system, such as a network service. Because execution of the task has become blocked, the task is unable to continue further processing, and yet remains active within the active pool 140A, thus inefficiently utilizing the computing resources of the active pool 140A.

To reduce this inefficient use of resources, the worker manager 140 can determine whether the task should be suspended until the dependency operation has completed. In one embodiment, the worker manager 140 may utilize a variety of different suspension techniques based on a predicted duration of the block. Illustratively, the worker manager 140 may employ a range of progressively more aggressive suspension techniques as the predicted duration of the block increases, such that a blocking duration of under 10 ms results in no suspension, a duration of between 10 and 100 ms results in suspension of a thread of the task within the virtual machine instance execution of the task, and a duration of over 100 ms results in removal of the task from its execution environment. The predicted blocking duration of a task may be determined in a variety of manners. In one embodiment, a user associated with a task may designate the predicted duration of a dependency operation, and the worker manager 140 may determine a predicted blocking duration based on how much of the predicted duration of the dependency operation remains at the point that the task blocks. In another embodiment, the worker manager 140 may assign a predicted duration of a dependency operation based on historical information regarding that dependency operation. For example, if each prior instance of the dependency operation completed in between 40 and 50 ms, the worker manager may assign a predicted duration of between 40 and 50 ms to a subsequent execution of the dependency operation (e.g., by taking an average, minimum, maximum, or other statistical measure of the range of historical durations). Historical durations of a dependency operation may include operations stemming from the same or different dependent tasks, as well as the same or different accounts, such that two tasks of different users that call the same dependency operation may or may not contribute to a shared set of historical duration data for that dependency operation. In some instances, historical durations of a dependency operation may be grouped based on parameters passed to that dependency operation, such that calls of the dependency operation with a first set of parameters are associated with different historical durations than calls to the dependency operation with a second set of parameters. Still further, historical durations of similar dependency operations may in some instances be grouped together, such that a set of HTTP calls to a specific domain share historical durations for the purposes of predicting duration of a subsequent call, or such that multiple related tasks (e.g., creating from a shared template, based on the same libraries, etc.) share historical durations for the purposes of predicting duration of a subsequent call For the purposes of FIG. 3A, it will be assumed that the worker manager 140 assigns a predicted duration to the block of a sufficient value that the task should be removed from its execution environment (e.g., container, virtual machine instance, etc.). Accordingly, the worker manager 140, at (5), saves the state of the task, to enable resuming of the task at a later point in time in either a new or regenerated execution environment.

A variety of mechanisms may be used to save the state of a task, depending on that state. For example, where the task is executing in a virtual machine instance, the worker manager 140 may save a "snapshot" (a record of the virtual machines state, including disk state, memory state, configuration, etc.) of the virtual machine instance as a state of the task. Similarly, where the task is executing in a container (either inside or outside a virtual machine instance), the worker manager 140 may "commit" the container, to save a current state of the container as an image. While saving the state of an entire execution environment (e.g., a virtual machine instance or container) can ensure that the task accurately resumes at a later point in time, it can also be relatively expensive from the point of view of computing resources. Moreover, if multiple tasks are currently executing in the execution environment, the saved state can include unnecessary and potentially undesirable information. An additional mechanism that can be used to save the state of a task may be to save a state of runtime environment execute the task. For example, the worker manager 140 may save the state of a node.js or Java virtual machine environment executing the task. Saving the state of a runtime environment may be associated with lower computing resource usage than saving the state of a full execution environment, and may allow other runtime environments within the same execution environment to continue running. A further mechanism to save the state of the task may be to save the state of objects within the task (e.g., variables, static objects, etc.). In some instances, saving the state of objects may be accomplished by a compiler or interpreter that servers to prepare the code of the task for execution. In other instances, saving the state of objects may be accomplished by the virtual machine itself. For example, if the task has not yet started processing (e.g., if blocking occurs very early in the task), the parameters input to the task may serve to save the state of the task. Conversely, if the task has nearly completed processing, the parameters output from the task may serve to save the state of the task. Third party tools may also be used to inspect the memory of the execution environment in order to save a state (sometimes referred to as a "checkpoint") of the task.

At (6), the worker manager 140 may remove the task from its execution environment, thereby eliminating the task's use of computing resources within the active pool 140A. In some instances, such as where the task was the only task within the execution environment, the worker manager 140 may further tear down or deconstruct the execution environment, further reducing computing resource use.

At (7), the worker manager 140 transmits the state information to the async controller 160, along with information regarding the block on the task, such as an identifier of the dependency operation on which the task has blocked or an expected duration of the block. The async controller 160, at (8), can store the retrieved state information and blocking information, such that the task can be resumed at a later time (e.g., when the dependency operation has completed or is expected to soon complete). At (9), the async controller 160 can attach a notifier to the blocking dependency, requesting that the worker manager 140 notify the async controller 160 when a blocking dependency has completed. For example, where the dependency operation is a task on the on-demand code execution system 110, the async controller 160 can request that the worker manager 140 notify the async controller 160 when the task has completed. Where the dependency operation is an HTTP request, the async controller 160 can request that the worker manager 140 notify the async controller 160 when the HTTP request has completed.

The interactions of FIG. 3A are continued on FIG. 3B, where, at (10), the worker manager 140 obtains a notification that the dependency operation of the previously suspended task has completed. Illustratively, where the dependency operation is a second task on the on-demand code execution system 110, the worker manager 140 may obtain a notification from an execution environment of that second task that the second task has completed. At (11), the worker manager 140 transmits the notification of the completed dependency to the async controller 160. The async controller 160, in turn, identifies the previously suspended task that is dependent on the dependency operation (e.g., from the blocking information received in the interactions of FIG. 3A) at (12), and retrieves the previously stored state information of the suspended task at (13). At (14), the async controller 160 transmits instructions to the worker manager 140 to resume the previously suspended task, along with the state information of the task.

At (15), the worker manager 140 utilizes the state information of the previously suspended task to resume the task, and continue execution. In one embodiment, the worker manager 140A may regenerate the initial execution environment of the task, by recreating a virtual machine instance or container in which the task was executing. However, the underlying "host" to the execution environment may vary, enabling efficient allocation of tasks by the worker manager 140. In another embodiment, because the task has previously been removed from its initial execution environment, the worker manager 140 may in some instances select a new execution environment for the resumed task, such a different virtual machine instance or container. Accordingly, the task may be resumed in any appropriate execution environment, based on a state of the active pool 140A at the time of resuming the task. This can enable more efficient allocation of tasks, by increasing the flexibility of task distribution after tasks have been suspended. In instances where multiple active pools 140A are utilized, the task may be resumed on a different active pool 140A than it initially executed, based on similar criteria to that used to initially assign execution of the task to an active pool 140A. Thus, suspension and resuming of a task by removing the task from its initial execution environment and restoring the task in a new or regenerated execution environment can both reduce the computing resources needed at the on-demand code execution system 110, by reducing the computing resources used by the task during blocking, and can increase the flexibility of the on-demand code execution system 110 in distributing tasks, by enabling the execution environment of the task to change or be re-located between suspension and resumption. One of skill in the art will therefore appreciate that the interactions of FIGS. 3A and 3B represent an improvement in the operation of the on-demand code execution environment, and address technical problems inherent within computing devices, such as the difficulty in efficiently scheduling asynchronous tasks, and the inefficiency of maintaining a blocked task due to the computing resource usage of that task.

One of skill in the art will appreciate that the interactions of FIGS. 3A and 3B may include additional or alternative interactions to those described above. For example, while some interactions are described with respect to the worker manager 140 generally, these interactions may occur with respect to individual execution environments or virtual machines within the active pool 140A managed by the worker manager. For example, a first virtual machine instance may implement interactions (3) through (7), while interaction (9) involves a second virtual machine instance associated with a dependency operation. In some instances, the interactions of FIG. 3A may involve multiple worker managers 140, such that interactions (3) through (7) are implemented with respect to a first worker manager 140, and interaction (9) involves a second worker manager 140. Moreover, while the interactions of FIG. 3A are described with respect to both the worker manager 140 and the async controller 160, in some embodiments functionalities of the async controller 160 may be implemented within the worker manager 140 itself, such that the worker manager 140 stores a state of the task, blocking information for the task, etc. Still further, while the interactions of FIG. 3A describe attachment of a notifier to a dependency process to enable resuming of a blocked task, the async controller 160 may additionally or alternatively resume a blocked task based on other criteria, such as the predicted blocking duration for the task. For example, rather than using a notifier to determine when to resume a task, the async controller 160 may resume a task on or before blocking of the task is expected to end (e.g., 10 ms before the block is expected to end, in order to provide time to resume the task prior to completion of the block).

While the interactions of FIGS. 3A and 3B are described with respect to an execution of a task that becomes blocked after execution of code corresponding to the task begins, a task may additionally or alternatively become blocked prior to execution. For example, a task may define a dependency operation as a prerequisite, such that the task can only begin execution after the perquisite operation has completed. In such instances, the worker manager 140 may save a state of the execution (which may simply refer to the inputs to the execution) as described above, and begin execution after the perquisite operations have completed, using the saved state.

Embodiments are illustratively described herein in which dependent and dependency operations have a one-to-one correspondence. Accordingly, each dependent and dependency operation may be assigned a unique identifier, and the dependent operation may block or unblock base on the status of the dependency operation. Other configurations of the on-demand code execution system 110 are also possible. For example, dependencies may be specified by a unique identifier of a function, rather than a specific operation (e.g., execution of the function, "function( )", rather than execution of a specific instance of that function, as called by a dependent operation). Accordingly, each time the dependency operation completes, one or more previously-blocked dependent operations may be eligible for resume. Depending on the functionality of the previously-blocked dependent operations, multiple operations may be able to resume based on a single completed dependency operation, or each dependent operation may require that a new completion of the dependency function occur before resuming. Where the dependent operation is a task on the on-demand code execution system 110, a creator of the task may specify whether the task requires an independent completion of a dependency operation, or can function based off of a shared completion of the dependency operation. Similarly, where the dependency operation is a task on the on-demand code execution system 110, a creator of the task can specify whether completion of the dependency operation enables one or many dependent operations to resume processing. Where less than all dependency operations are eligible to resume after completion of a dependency operation, the async controller 160 may which dependent operations are eligible to resume based on any number of ordering algorithms, such as first-in, first-out, shortest deadline first (for tasks associated with deadlines), etc. In some instances, dependencies may be defined by a combination of function and parameters, such that a dependent task is dependent on a function being called with a specific set parameters, no parameters, etc.

While the present application enables efficient handling of blocked tasks due to asynchronous dependencies, the present application further enables efficient scheduling of asynchronous task executions, even in non-blocking situations. Specifically, embodiments of the present application can operate to predict a "deadline" at which the result of an asynchronous task execution will be required, and to schedule execution of the asynchronous task based on that deadline. Such scheduling can enable load balancing or time-shifted use of computing resources within the on-demand code execution system 110, thus increasing the overall efficiency of the system. For example, where a first task execution calls for execution of a second task asynchronously, but the result of the second task execution is not expected to be needed for a relatively long period of time, embodiments of the present application can enable execution of the second task to be delayed until the result of the second task execution is required, thereby enabling the second task to execute at any efficient time prior to a deadline, such as when the on-demand code execution environment 110 has excess computing capacity.

Figure 4A:
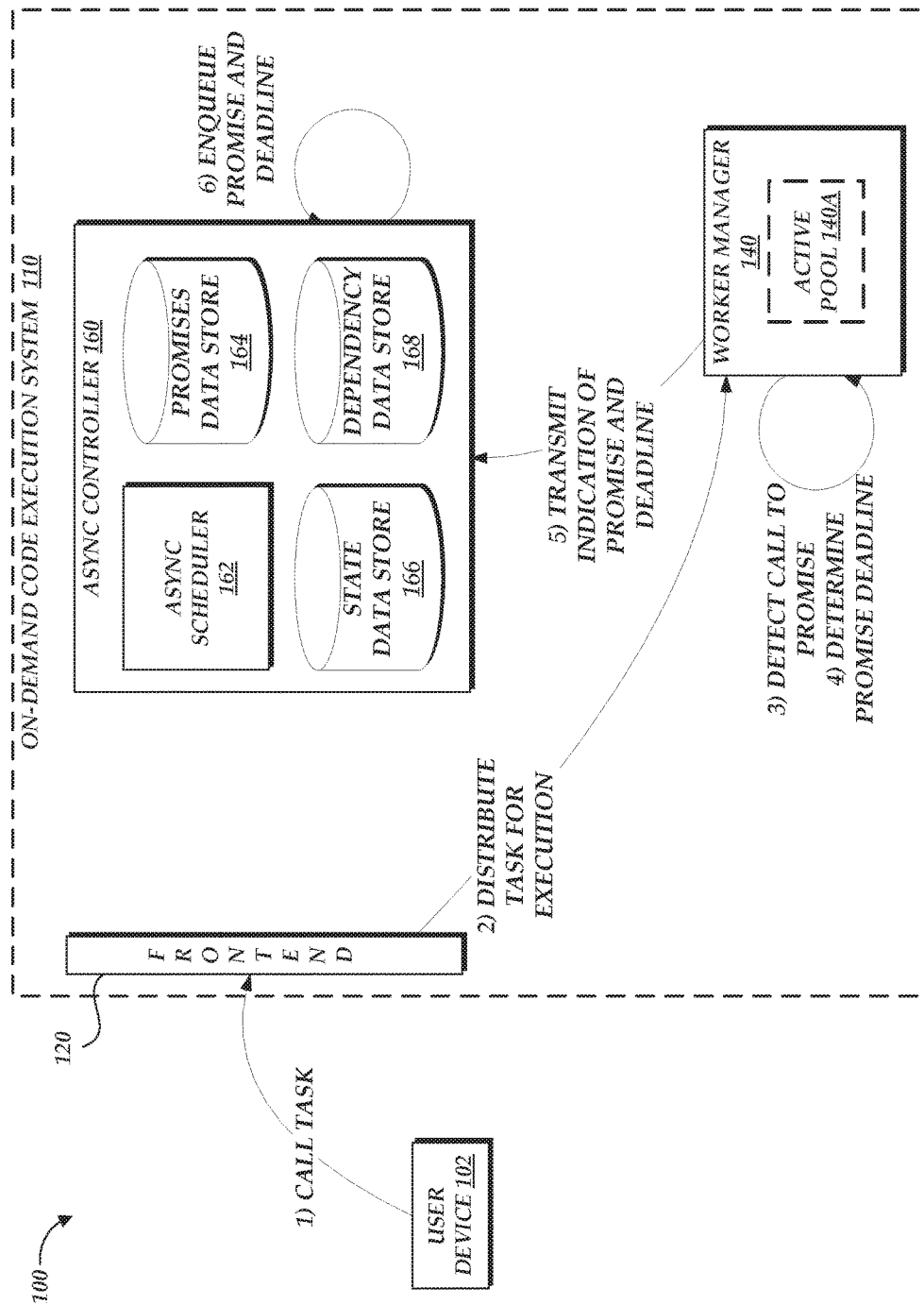
FIGS. 4A-4C are flow diagrams depicting illustrative interactions for managing execution of asynchronous task calls in an on-demand code execution system based on a deadline associated with the task.
Figure 4B:
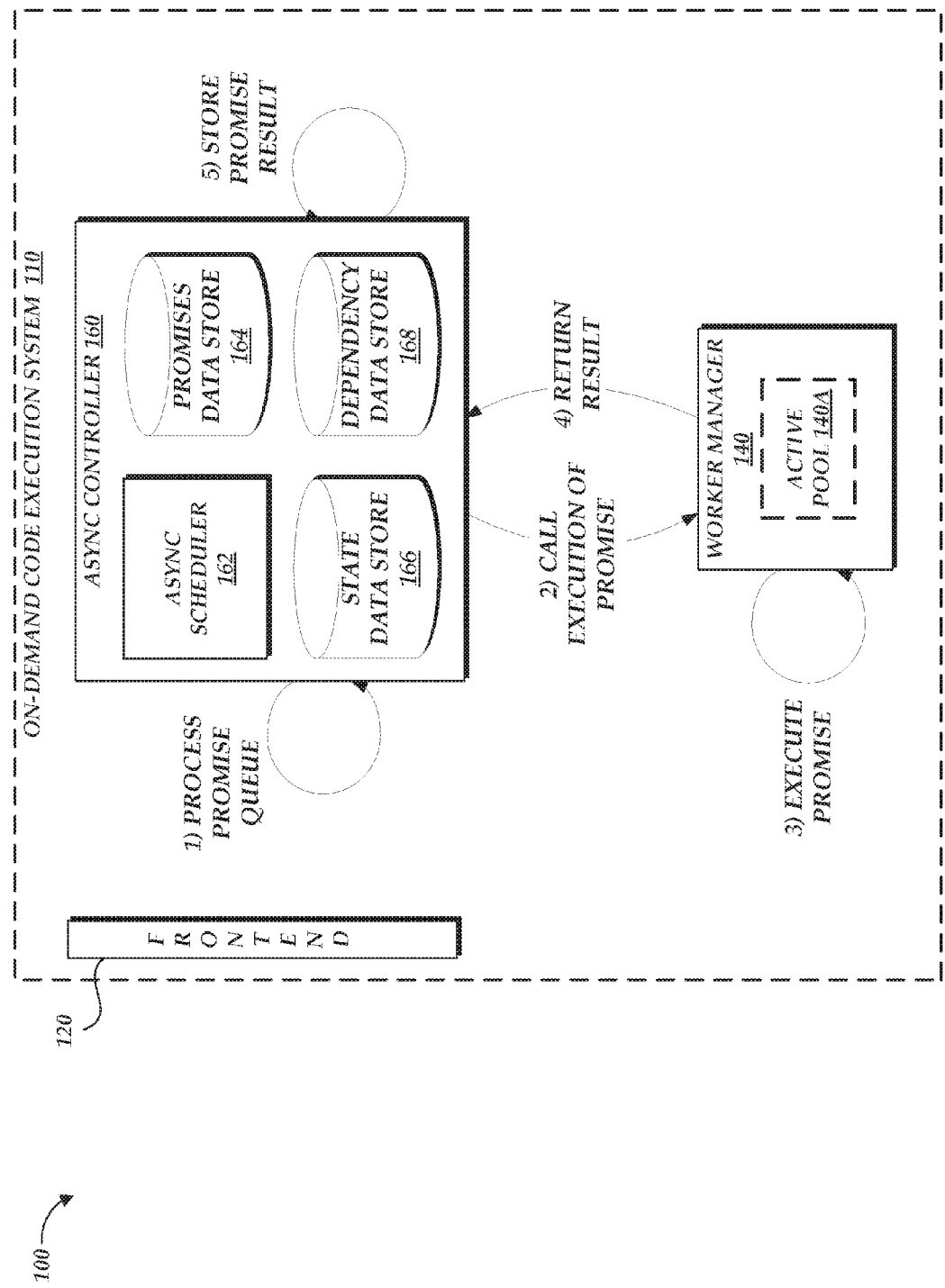
Figure 4C:
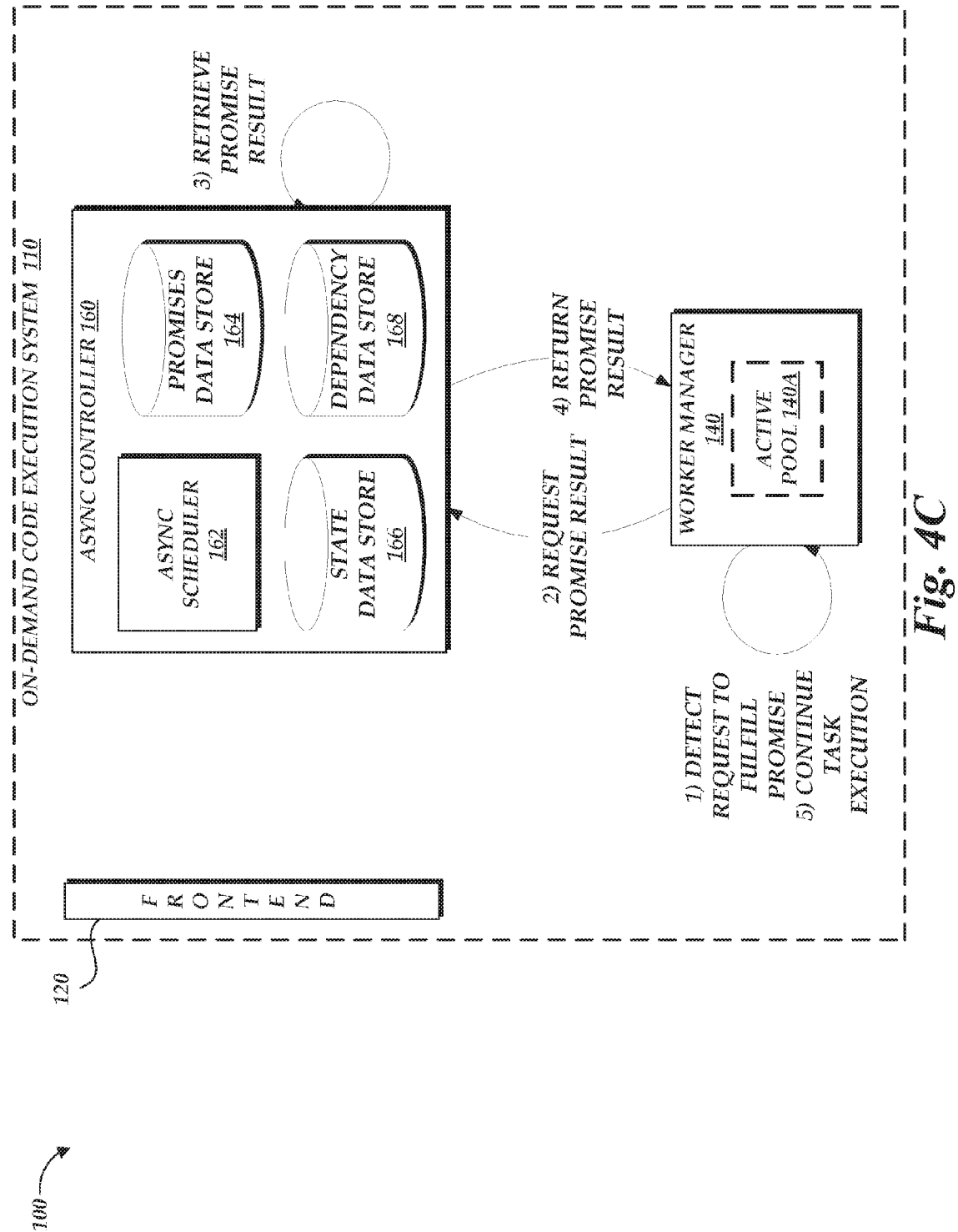

Illustrative interactions for scheduling asynchronous task executions based on deadlines are described in FIGS. 4A through 4C. Specifically, FIG. 4A depicts illustrative interactions for detecting a call for asynchronous execution of a task, FIG. 4B depicts illustrative interactions for processing a queue of asynchronous task executions based on associated deadlines, and FIG. 4C depicts illustrative interactions for retrieving results of a completed asynchronous task execution.

The interactions of FIG. 4A begin at (1), where a user device 102 submits to the frontend 120 a call to a task on the on-demand code execution system. As noted above, submission of a call may include transmission of specialized data to the frontend 120, such as a HTTP packet or API call referencing the task alias. While the interactions of FIG. 4A are described as including an explicit call to the task by the user device 102, calls to the task may occur in a variety of manners, including submission of a call by auxiliary services 106 (not shown in FIG. 4A) or generation of a call by the on-demand code execution system 110 (e.g., based on a rule to call the alias when specific criteria are met, such as elapsing of a period of time or detection of data on an auxiliary service 106). The call may include any information required to execute the task, such as parameters for execution, authentication information under which to execute the task or to be used during execution of the task, etc.

Thereafter, at (2), the frontend 120 distributes the task for execution by the worker manager 140. While not shown in FIG. 4A, in some instances the frontend 120 may perform additional operations prior to distributing the task to the worker manager 140, such as determining whether sufficient capacity exists to execute the task, queuing the task, determining accounts to which to attribute execution of the task, etc. Such operations are described in more detail in the '556 Patent.

At (3), the worker manager 140 detects a call to asynchronously execute another task on the on-demand code execution system 110, which may illustratively correspond to a call to a different task, or to a second execution of the same task. For ease of description within FIGS. 4A through 4C, the asynchronously called task will be referred to as a "promise." While the term "promise" is sometimes used to refer to code that will later provide some return value (often referred to as a "future"), the use of the term herein does not necessarily imply that the asynchronously called task will return a value. Rather, the term "promise," as used herein, is intended to refer to a call to a task that is expected to complete some functionality used by the calling task, which may include returning a value, updating an external service (e.g., a database), or other functionalities used by tasks on the on-demand code execution environment 110. In one embodiment, a creator of code corresponding to a task may designate a call to another task as a "promise." In another embodiment, the worker manager 140 may detect a call to a promise by detecting that a call to asynchronously execute another task has occurred, and that a result of that task will not be required for at least a threshold duration, which may be a static duration (e.g., 100 ms) or a variable duration (e.g., at least 50 ms longer than the asynchronously called task is expected to take to complete, which may be determined based on historical data regarding execution of the task). The duration between when a promise is called and when completion of the promise is expected to be required may be defined by a creator of the code for the calling task, or determined by the worker manager 140. Illustratively, the worker manager 140 may determine a point in code of a calling task at which a result of a promise is expected by detecting a reference to a result of the promise within the code, or detecting a point in the code specified by a creator of the calling task as dependent on the promise. The worker manager 140 may then estimate the duration between a call to the promise and the subsequent reference point based on prior historical data regarding prior executions of the calling task or related tasks (e.g., creating from a shared template, based on the same libraries, etc.), by summing expected durations of each function called within the calling task between a call to the promise and the subsequent reference point (where the duration of each function may itself be based on historical data regarding calls to the function), by estimating the duration based on total lines of code, etc.

In the instance that completion of the promise is not estimated to be required for at least a threshold amount of time, the worker manager 140 can, at (4), establish a deadline for the promise. In one embodiment, the deadline can be set to the point in time at which completion of the promise is expected to be required. In another embodiment, the deadline can decreased to account for an estimated time needed to complete execution of the promise (e.g., taking into account delays required to initialize execution of the function on the on-demand code execution environment, store results, etc.). While deadlines are described illustratively as based on predicted execution time, creators of tasks may additionally or alternatively specify deadlines manually. For example, a creator of a task may, at the time that a promise is called, designate the promise as having a specific deadline (e.g., 100 ms) or having a range of deadlines (e.g., short, medium, or long) that the on-demand code execution environment may associated with specific deadlines.

Thereafter, at (5), the worker manager 140 transmits an indication of the promise and associated deadline to the async controller 160, which can be configured to schedule execution of the promise based on the deadline. At (6), the async controller 160 enqueues the promise for subsequent execution based on the associated deadline. In this regard, the async controller 160 may utilize a variety of scheduling algorithms to enqueue promises based on deadlines, such as an earliest deadline first algorithm, work-conserving scheduling, etc.

Illustrative interactions for processing a set of queued promises are described with reference to FIG. 4B. Specifically, at (1), the async controller 160 can process the promise queue to execute tasks on the queue in an order determined based on associated deadlines. For a given promise, the async controller 160 can determine an appropriate time to call execution of the promise, and at (2), call to the worker manager 140 for execution of the promise. Appropriate times to call for execution of a promise may in some instances be based on a capacity of the worker manager 140 to execute tasks. For example, the async controller 160 may wait to call for execution of a promise until point when the active pool 140A has excess capacity. In other instances, the async controller 160 may attempt to limit the total number of promises executing at any given time, or the number of calls per second to execute promises. Still further, the async controller 160 may attempt to process the queue such that promises on the queue complete before their associated deadlines. Additionally or alternatively, the queueing of each promise may be managed at least in part on a configuration of an underlying account associated with execution of the promise. For example, if an account is configured such that no more than n tasks are executing at a given time, a promise associated with the account may be dequeued and executed at a time that less than n tasks associated with the account are executing. In some instances, promises on the queue may be processed "lazily," such that they are called either after completion of the promise is required by a calling task, or at the last otherwise suitable time such that the promise is expected to complete processing prior to completion of the promise being required by a calling task.

After receiving a call to execute the promise the worker manager 140, at (3), executes the promise. Illustratively, the worker manager 140 can execute the promise in the same manner as other tasks on the on-demand code execution system 110, such as by selecting a most appropriate execution environment for the task and executing code of the task within the execution environment. In some instances, the worker manager 140 may select an execution environment for the promise based on a task dependent on the promise (e.g., such that both the promise and the dependent task execute in the same environment, on the same host device, etc.).

At (4), the worker manager 140 returns a result of the promise's execution to the async controller 160. In one embodiment, the result may simply be an indication that the promise has executed successfully. In another embodiment, the result may be an output of the promise, such as a return value. At (5), the async controller 160 stores a result of the promise (e.g., in the promises data store 164).

Illustrative interactions for enabling tasks to utilize results of a promise are described with reference to FIG. 4C. Specifically, for the purposes of FIG. 4C, it will be assumed that a task is executing on the active pool 140A, and has previously called for execution of a promise, as described in FIG. 4A. It will further be assumed that the async controller 160 has managed execution of that promise, as described in FIG. 4B. Accordingly, at (1), the worker manager 140 detects that the task has requested to fulfill the promise (e.g., reached a point during execution such that completion of the promise is required). At (2), the worker manager 140 transmits a request to the async controller 160 for a result of the promise (e.g., a return value of the promise, an indication that the promise has completed execution successfully, etc.). The async controller 160, in turn, retrieves a result of the promise at (3), and returns the result to the worker manager 140 at (4).

Thereafter, at (5), the worker manager 140 passes a result of the promise's execution to the dependent task, enabling the task to continue execution. Accordingly, the dependent task can be expected to execute with little or no delay due to the promise, while still enabling the on-demand code execution system 110 to schedule execution of the promise according to the state of that system 110, thus increasing the efficiency of computing resource use within the on-demand code execution system 110.

One of skill in the art will appreciate that the interactions of FIG. 4A through 4C may include additional or alternative interactions to those described above. For example, while some interactions are described with respect to the worker manager 140 generally, these interactions may occur with respect to individual execution environments or virtual machines within the active pool 140A managed by the worker manager. Moreover, some or all of the functionalities ascribed to the async controller 160 may be implemented directly within the worker manager 140. For example, rather than return a result of a promise's execution to the async controller 110, the worker manager 140 may itself store the result of the promise's execution, or may pass that result to an execution environment of a call dependent on the promise's execution. Similarly, while FIG. 4C is described as a "pull" model, such that the worker manager 140 retrieves a result of a promise's execution according to the requirements of a dependent task, embodiments of the disclosure may utilize a "push" model, such that a result of the promise's execution is provided to an execution environment of a dependent task without requiring that execution environment to issue a query for the result. In some instances, the ordering of interactions described in FIGS. 4A through 4C may be modified. For example, in some instances, a single dependency operation may satisfy dependencies from multiple dependent operations. As such, when a dependent operation calls a promise also previously called by another dependent operations, the promise may have already been fulfilled. Accordingly, rather than enqueing the promise and deadline (as described above with reference to interaction (6) of FIG. 4A), the async controller 160 may simply return a result of the promise to the worker manager 140. As a further example, in some instances, processing the promise queue according to the deadlines of promises may result in instances where a promise result is requested (e.g., interaction (2) of FIG. 4C) before the promise has been completed (e.g., via the interactions of FIG. 4B). In such instances, a request to retrieve a promise result may cause the promise to be executed. Accordingly, the interactions of FIG. 4B may occur as intervening interactions, during the interactions of FIG. 4C.

As discussed above, dependencies between operations may be specified by specific reference to individual executions, general references to functions, or references to an execution of a function with specified parameters. The interactions of FIG. 4C may therefore be modified to address potential one-to-many or many-to-many mappings between dependent and dependency operations. For example, where multiple dependent operations call the same promise function (e.g., with the same or different parameters), the async controller 160 may enqueue multiple instances of that promise together, and utilize the same execution environment (or different execution environments on the same virtual machine instance) to execute the promise function, thereby increasing the efficiency of the function. Moreover, when completion of a promise function occurs, the async controller 160 may select which dependent operations should be notified of such completion (e.g., all functions, a single function, a specified number of functions, etc.), as determined by either the configuration of the dependent operations, the configuration of the promise, or both. Illustratively, where less than all dependent operations should be notified of completion of the promise, the async controller 160 may which dependent operations should be notified based on any number of ordering algorithms, such as first-in, first-out, shortest deadline first (for tasks associated with deadlines), etc.

Figure 5:
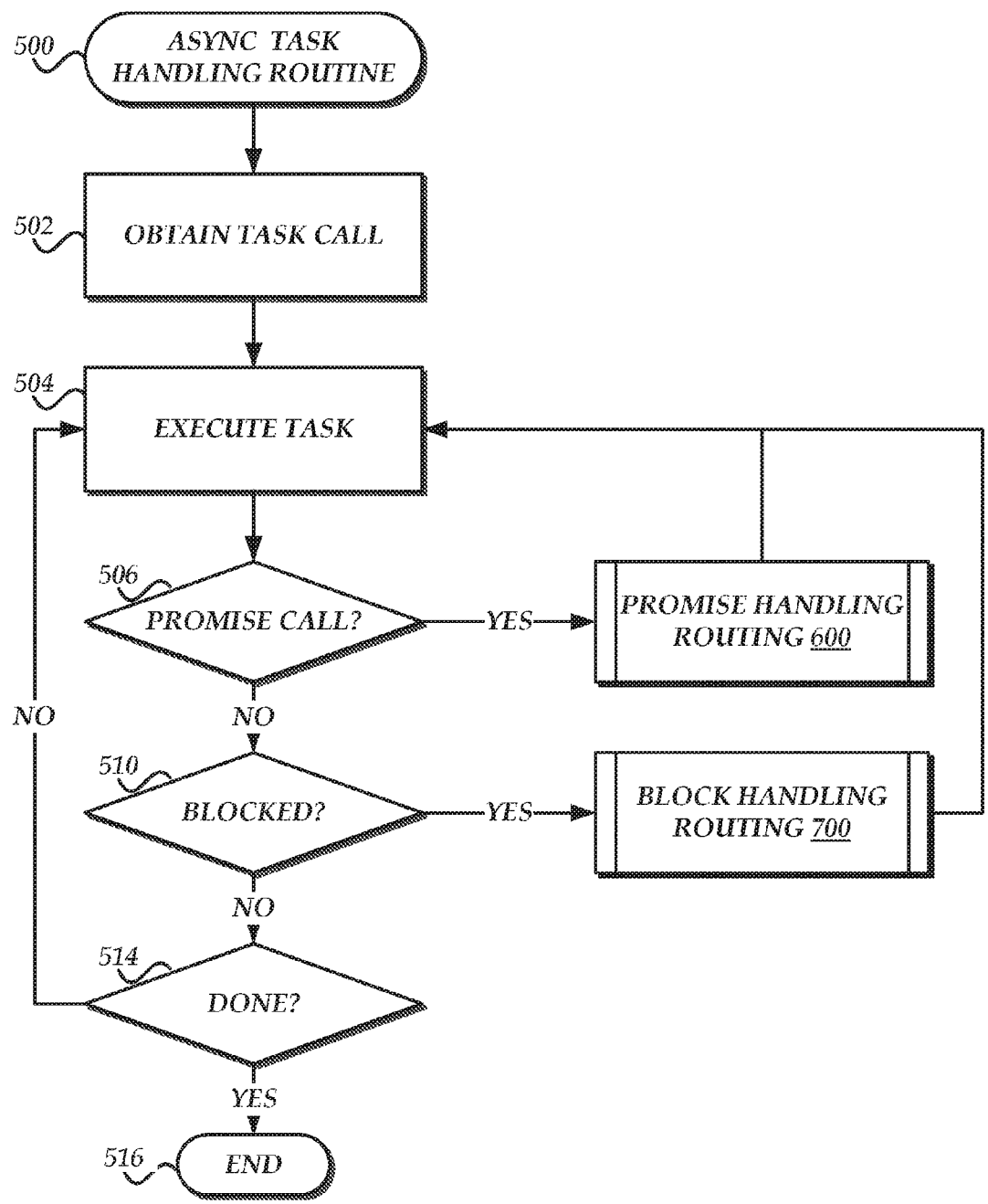
FIG. 5 is a flow chart depicting an illustrative routine for handling asynchronous task execution in an on-demand code execution system.

With reference to FIG. 5, a block diagram depicting an illustrative routine 500 for handling execution of asynchronous tasks on the on-demand code execution environment 110 will be described. The routine 500 begins at block 502, where the on-demand code execution system 110 (e.g., via a frontend 120) receives a call to a task. At block 504, the on-demand code execution environment 110 (e.g., via a worker manager 140) proceeds to execute the task, as described in more detail in the '556 Patent.

At block 506, the on-demand code execution system 110 determines whether the executing task has made a call to a promise (e.g., an asynchronously executing task whose completion is not required by the calling task for at least a threshold duration). If so, the routine 500 proceeds to implement promise handling routine 600. As is described below, the promise handling routine 500 can enable the promise to be queued for execution at the on-demand code execution system 110 in an efficient manner, such that the promise is expected to complete before or near the time that the calling task requires the completion, but can be otherwise scheduled according to the state of the on-demand code execution system 110. Thereafter, the routine returns to block 504.

If no call to a promise has been made, the routine 500 continues to block 510, where the on-demand code execution system 110 determines whether the task has become blocked, awaiting completion of an asynchronous operation (such as a second task or operation of an external service). If so, the routine 500 proceeds to implement block handling routine 700, which, as described below, enables the task to be suspended and removed from an execution environment, and to be resumed after or shortly before a dependency has completed. In some instances, routine 700 may only be implemented if the task is expected to be blocked for over a threshold amount of time (e.g., over 100 ms). Thereafter, the routine returns to block 504.

If the routine has not been blocked, the routine 500 continues to block 514, which functions to pass the routine 500 back to block 504, so long as execution continues. When execution halts, the routine 500 passes to block 516, and the routine 500 ends.

As can be seen from the routine 500, while handling of blocked execution and handling of promises are sometimes described separately in the present disclosure, both functionalities may be implemented in conjunction. For example, where execution of a task calls a promise, and that promise fails to execute by the time required at the calling task (e.g., due to overloading of the on-demand code execution system 110), the calling task may become blocked, and be suspended by the on-demand code execution system 110. In some instances, other functionalities may be implemented. For example, where a hierarchy of dependencies exists between multiple tasks, such that a "tree" of blocked tasks exists, the on-demand code execution system 110 may order execution of the tasks according to their dependencies, such that each blocked task is suspended until dependency tasks have completed or are expected to shortly complete. In some instances, the on-demand code execution system 110 may cause multiple tasks within a "tree" to be executed by the same execution environment or same physical computing device, to reduce intercommunication times among the tasks. In other instances, the on-demand code execution system 110 may execute tasks within the tree across multiple execution environments or physical computing devices, in order to process the tree of tasks at least partially in parallel.

Figure 6:
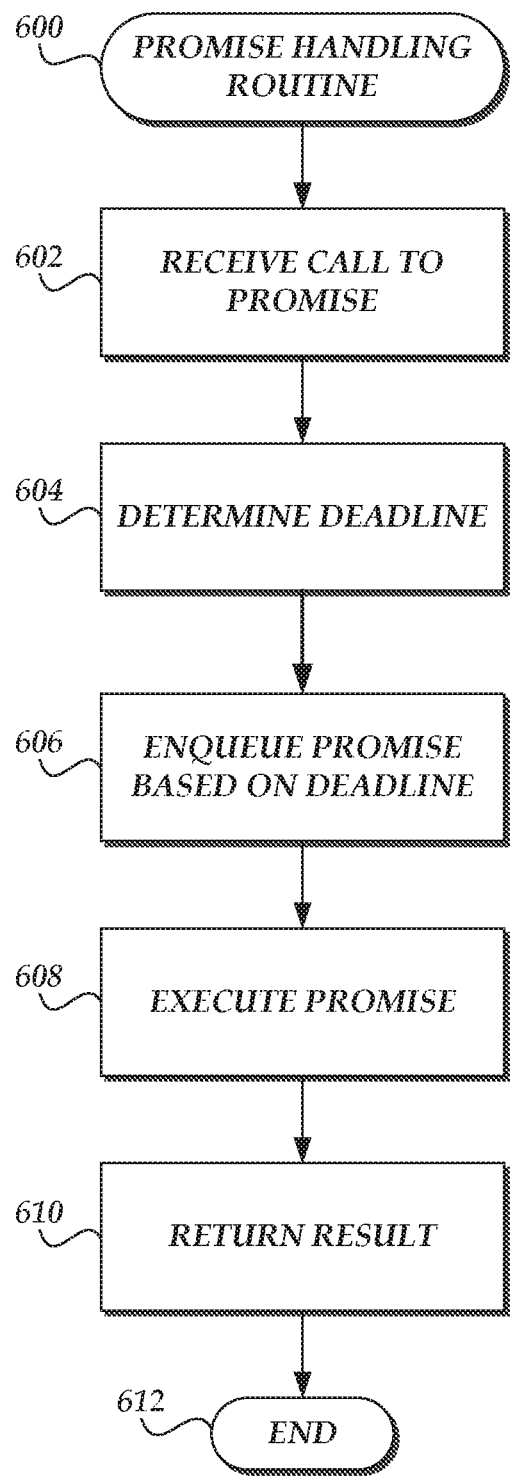
FIG. 6 is a flow chart depicting an illustrative routine for managing execution of asynchronous task calls in an on-demand code execution system based on a deadline associated with the task.

With reference to FIG. 6, an illustrative routine 600 for handling calls to promises in the on-demand code execution system 110 will be described. The routine may be implemented, for example, in conjunction with the asynchronous task handling routine 500 of FIG. 5. The routine 600 begins at block 602, where the on-demand code execution system 110 receives a call to a promise (e.g., from another task executing on the on-demand code execution system 110).

At block 604, the on-demand code execution system 110 determines a deadline associated with the promise. Illustratively, the deadline can be set to the point in time at which completion of the promise is expected to be required. As discussed above, that point in time can be established by a creator of a calling task, or determined by the on-demand code execution system 110 based on historical executions of the calling task. Illustratively, the on-demand code execution system 110 may determine a point in code of a calling task at which a result of a promise is expected by detecting a reference to a result of the promise within the code, or detecting a point in the code specified by a creator of the calling task as dependent on the promise. The on-demand code execution system 110 may then estimate the duration between a call to the promise and the subsequent reference point based on prior historical data regarding prior executions of the calling task, by summing expected durations of each function called within the calling task between a call to the promise and the subsequent reference point (where the duration of each function may itself be based on historical data regarding calls to the function), by estimating the duration based on total lines of code, etc. The on-demand code execution system 110 may then establish the estimated deadline based on the length of time between the call to the promise and the time at which the subsequent reference to the promise is expected to occur during execution of the task.

At block 606, the on-demand code execution system 110 enqueues the promise for execution based on the deadline. In this regard, the on-demand code execution system 110 may utilize a variety of scheduling algorithms to enqueue promises based on deadlines, such as an earliest deadline first algorithm, work-conserving scheduling, etc.

At block 608, the on-demand code execution system 110 executes the promise, with timing dependent on processing of the queue of promises. Illustratively, on-demand code execution system 110 may wait to call for execution of the promise until point when the active pool 140A has excess capacity. In other instances, the on-demand code execution system 110 may attempt to limit the total number of promises executing at any given time, or the number of calls per second to execute promises. Still further, the on-demand code execution system 110 may attempt to process the queue such that promises on the queue complete before their associated deadlines. Additionally or alternatively, the queueing of each promise may be managed at least in part on a configuration of an underlying account associated with execution of the promise. For example, if an account is configured such that no more than n tasks are executing at a given time, a promise associated with the account may be dequeued and executed at a time that less than n tasks associated with the account are executing. In some instances, promises on the queue may be processed "lazily," such that they are called either after completion of the promise is required by a calling task, or at the last otherwise suitable time such that the promise is expected to complete processing prior to completion of the promise being required by a calling task.

At block 610, the on-demand code execution system 110 returns a result of the promise to the calling task. In some instances, a result may be return directly to the calling task. In other instances, the result may be stored and made available to the calling task on request (e.g., based on a reference to the calling within executing code of the tasks). The routine 600 can then end at block 612.

Figure 7:
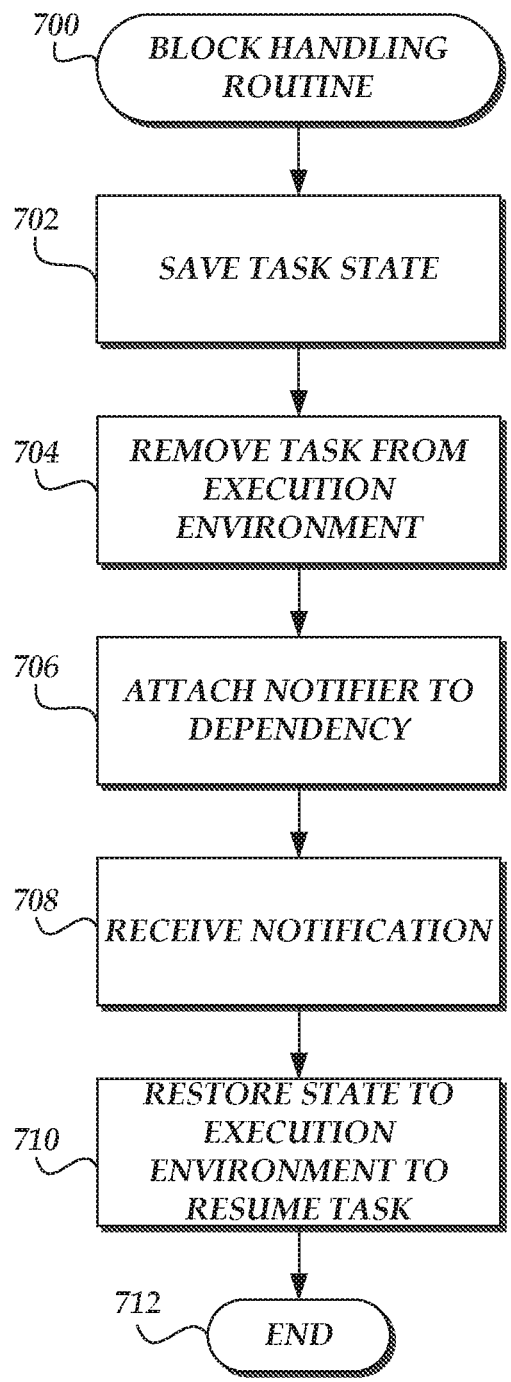
FIG. 7 is a flow chart depicting an illustrative routine for handling blocked execution of a task due to an asynchronous dependency.

With reference to FIG. 7, an illustrative routine 700 for handling blocked executions in the on-demand code execution system 110 based on asynchronous operations will be described. The routine 700 may be implemented, for example, in conjunction with the asynchronous task handling routine 500 of FIG. 5. For the purposes of description of FIG. 7, it will be assumed that the on-demand code execution system 110 has begun executing a task, which is blocked due to an asynchronous operation. The routine 700 begins at block 702, where the on-demand code execution system 110 saves the state of the task. As described above, a variety of strategies may be used to save the state of a task, such as saving a state of the execution environment, runtime environment, the executing code itself, or objects created by the code (e.g., inputs, outputs, variables, etc.).

At block 704, the on-demand code execution system 110 removes the task from its current execution environment, in order to reduce the computing resources required to maintain the blocked task. For example, the on-demand code execution system 110 may halt execution of the task code by a virtual machine instance or container, enabling the virtual machine instance or container to continue to process other tasks. In some instances, such as where an execution environment of the blocked task is not needed to process other tasks, the on-demand code execution system 110 may tear down or deconstruct the execution environment, further reducing computational load within the on-demand code execution system 110.

At block 706, the on-demand code execution system 110 can attach a notifier to the dependency operation, such that the on-demand code execution system 110 is informed when the dependency operation completes (and therefore, when the blocked task should continue operation). For example, the on-demand code execution system 110 may transmit a request to a virtual machine instance executing the dependency operation to notify the on-demand code execution system 110 when the dependency operation has completed. In some instances, the dependency operation may already be configured to transmit such a notification (e.g., based on the nature of the dependency operation itself), and thus, block 706 may occur automatically in conjunction with calling the dependency operation.

At block 708, the on-demand code execution system 110 receives a notification that the dependency operation has completed. Thereafter, at block 710, the on-demand code execution system 110 can utilize the previously saved state of the calling, previously blocked, task to restore the task, and resume execution of the task from a point at which it was previously blocked. In one embodiment, the on-demand code execution system 110 may resume the task by recreating the execution environment of the task. In another embodiment, the on-demand code execution system 110 may resume the task by placing the task into a new execution environment, which may result in the task being executed by a different physical computing device within the on-demand code execution system 110. Because the execution environment of the task may change between initial execution and resumption, the on-demand code execution system 110 is enabled to more efficiently allocate that resumption according to the resources available at the time of resumption. After resuming execution, the routine 700 ends at block 712.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to manage blocking of code executions in an on-demand code execution system due to asynchronous operations, wherein the on-demand code execution system comprises a plurality of execution environments on which user-submitted code may execute, the system comprising:
    a non-transitory data store configured to store state information regarding suspended executions of tasks on the on-demand code execution system, wherein individual tasks are associated with code executable to implement functionality corresponding to the individual tasks; and
    one or more processors configured with computer-executable instructions to:
        obtain instructions to execute a first task associated with first executable code;
        begin execution of the first executable code within a first execution environment, wherein execution of the first executable code calls for execution of a first dependency operation;
        after detecting that execution of the first executable code has become blocked awaiting completion of the first dependency operation:
            determine that a predicted duration of blocking for the execution of the first executable code satisfied a threshold value;
            generate state information for the execution of the first executable code;
            store the generated state information in the non-transitory data store; and
            remove the execution of the first executable code from the first execution environment; and
        after detecting that the first dependency operation has completed:
            select a second execution environment in which to resume execution of the first executable code; and
            utilize the generated state information, as stored in the non-transitory data store, to resume execution of the first executable code in the second execution environment.

2. The system of claim 1, wherein the first execution environment is at least one of a virtual machine instance or a container.

3. The system of claim 1, wherein the second execution environment is a different execution environment from the first execution environment.

4. The system of claim 1, wherein the second execution environment is a regenerated version of the first execution environment.

5. The system of claim 1, wherein the state information for the execution of the first executable code comprises at least one of a virtual machine state, a container state, a state of memory associated with the execution, or a state of objects of the first executable code during the execution.

6. A computer-implemented method to manage blocking of code executions in an on-demand code execution system, wherein the on-demand code execution system comprises a plurality of execution environments on which user-submitted code may execute, the computer-implemented method comprising:
    obtain instructions to execute first executable code within a first execution environment of the on-demand code execution system;
    after detecting that execution of the first executable code is blocked awaiting completion of a first dependency operation:
        generating state information for the execution of the first executable code;
        storing the generated state information in a non-transitory data store distinct from the first execution environment; and
        removing the execution of the first executable code from the first execution environment; and
    after detecting that the first dependency operation has completed:
        selecting a second execution environment in which to resume execution of the first executable code; and
        utilizing the generated state information, as stored in the non-transitory data store, to resume execution of the first executable code in the second execution environment.

7. The computer-implemented method of claim 6 further comprising:
    predicting a duration of blocking for the execution of the first executable code; and determining that the predicted duration of blocking for the execution of the first executable code satisfied a threshold value.

8. The computer-implemented method of claim 7, wherein predicting a duration of blocking for the execution of the first executable code comprises:
predicting a first length of time between when the execution of the first executable code called for execution of the first dependency operation and when the execution of the first executable code requires completion of the first dependency operation;
predicting a second length of time required for execution of the first dependency operation to complete; and
assigning a difference between the first length of time and the second length of time as the predicted duration of blocking for the execution of the first executable code.

9. The computer-implemented method of claim 8, wherein the first length of time is predicted based on historical executions of the first executable code.

10. The computer-implemented method of claim 8, wherein the second length of time is predicted based on historical executions of the first dependency operation.

11. The computer-implemented method of claim 6, wherein selecting a second execution environment in which to resume execution of the first executable code comprises selecting the second execution environment based at least in part on the state information.

12. The computer-implemented method of claim 6, wherein the execution of the first executable code causes a call to execute an instance of the first dependency operation, and wherein detecting that the first dependency operation has completed comprises detecting that the instance of the first dependency operation has completed.

13. The computer-implemented method of claim 6, wherein a plurality of executions of the first executable code depend on completion of the first dependency operation, and wherein the method further comprises, on detecting that the first dependency operation has completed, selecting at least one of the plurality of executions of the first executable code to be resumed.

14. The computer-implemented method of claim 6 further comprising:
during execution of the first execution code, detecting a call for execution of a second dependency operation;
determining a deadline for the second dependency operation based at least in part on historical data regarding prior executions of the first executable code;
enqueuing the first dependency operation into the queue based at least in part on the deadline; and
processing the queue based at least in part on an available capacity of the on-demand code execution system to execute operations, wherein processing the queue comprises executing the first dependency operation.

15. Non-transitory computer-readable storage media including computer-executable instructions that, when executed by a computing system, cause the computing system to:
obtain instructions to execute first executable code within a first execution environment of an on-demand code execution system comprising a plurality of execution environments;
after detecting that execution of the first executable code has become blocked awaiting completion of a first dependency operation:
generate state information for the execution of the first executable code;
store the generated state information in a non-transitory data store distinct from the first execution environment; and
remove the execution of the first executable code from the first execution environment; and
after detecting that the first dependency operation has completed:
select a second execution environment in which to resume execution of the first executable code; and
utilize the generated state information, as stored in the non-transitory data store, to resume execution of the first executable code in the second execution environment.

16. The non-transitory computer-readable storage media of claim 15, wherein the computer-executable instructions further cause the computing system to:
predict a duration of blocking for the execution of the first executable code; and
determine that the predicted duration of blocking for the execution of the first executable code satisfied a threshold value.

17. The non-transitory computer-readable storage media of claim 16, wherein predicting the duration of blocking for the execution of the first executable code comprises:
predicting a first length of time between when the execution of the first executable code called for execution of the first dependency operation and when the execution of the first executable code requires completion of the first dependency operation;
predicting a second length of time required for execution of the first dependency operation to complete; and
assigning a difference between the first length of time and the second length of time as the predicted duration of blocking for the execution of the first executable code.

18. The non-transitory computer-readable storage media of claim 15, wherein at least one of the first or second lengths of time is predicted based on historical executions on the on-demand code execution system.

19. The non-transitory computer-readable storage media of claim 15, wherein the computer-executable instructions cause the computing system to select the second execution environment in which to resume execution of the first executable code based at least in part on the state information.

20. The non-transitory computer-readable storage media of claim 15, wherein the execution of the first executable code causes a call to execute an instance of the first dependency operation, and wherein detecting that the first dependency operation has completed comprises detecting that the instance of the first dependency operation has completed.

21. The non-transitory computer-readable storage media of claim 15, wherein a plurality of executions of the first executable code depend on completion of the first dependency operation, and wherein the computer-executable instructions cause the computing system to select at least one of the plurality of executions of the first executable code to be resumed.

22. The non-transitory computer-readable storage media of claim 15, wherein the computer-executable instructions further cause the computing system to:
during execution of the first execution code, detect a call for execution of a second dependency operation;
determine a deadline for the second dependency operation based at least in part on historical data regarding prior executions of the first executable code; and execute the first dependency operation based at least in part on the deadline and an available capacity of the on-demand code execution system to execute operations.

\* \* \* \* \*